United States Patent [19]

Ryan

[11] Patent Number: 4,652,946

[45] Date of Patent: Mar. 24, 1987

[54] FAST DEPLOYING TAPE TRANSPORT

[75] Inventor: Dennis M. Ryan, Redwood City, Calif.

[73] Assignee: Ampex Corporation, Redwood City, Calif.

[21] Appl. No.: 722,924

[22] Filed: Apr. 12, 1985

[51] Int. Cl.$^4$ .................. G11B 15/665; G11B 23/087
[52] U.S. Cl. ...................................... 360/85; 242/199; 360/95
[58] Field of Search ................... 242/75.43, 199, 200, 242/187, 189, 190, 195; 226/181–183, 189, 91; 360/71, 74.1–74.3, 85, 95, 132; 250/570, 571

[56] References Cited

U.S. PATENT DOCUMENTS

| | | | |
|---|---|---|---|
| 2,675,973 | 4/1954 | Reed et al. | 226/183 X |
| 3,985,277 | 10/1976 | Wright | 226/177 |
| 4,445,154 | 4/1984 | Kihara et al. | 360/85 |
| 4,517,613 | 5/1985 | Shibaike et al. | 360/85 |

Primary Examiner—John M. Jillions
Attorney, Agent, or Firm—Charles M. Carman; Harry G. Thibault; Joel D. Talcott

[57] ABSTRACT

A machine for extracting tape from a cassette and for threading the tape to a monoplanar disposition for longitudinal shuttling and transducing by fixed transducing heads, and then further threading the tape, if desired, to a helical disposition around a rotating head and scanning drum assembly without interrupting the longitudinal shuttling or transducing action.

29 Claims, 18 Drawing Figures

FIG_1

FIG_2

FIG_3

FIG_6

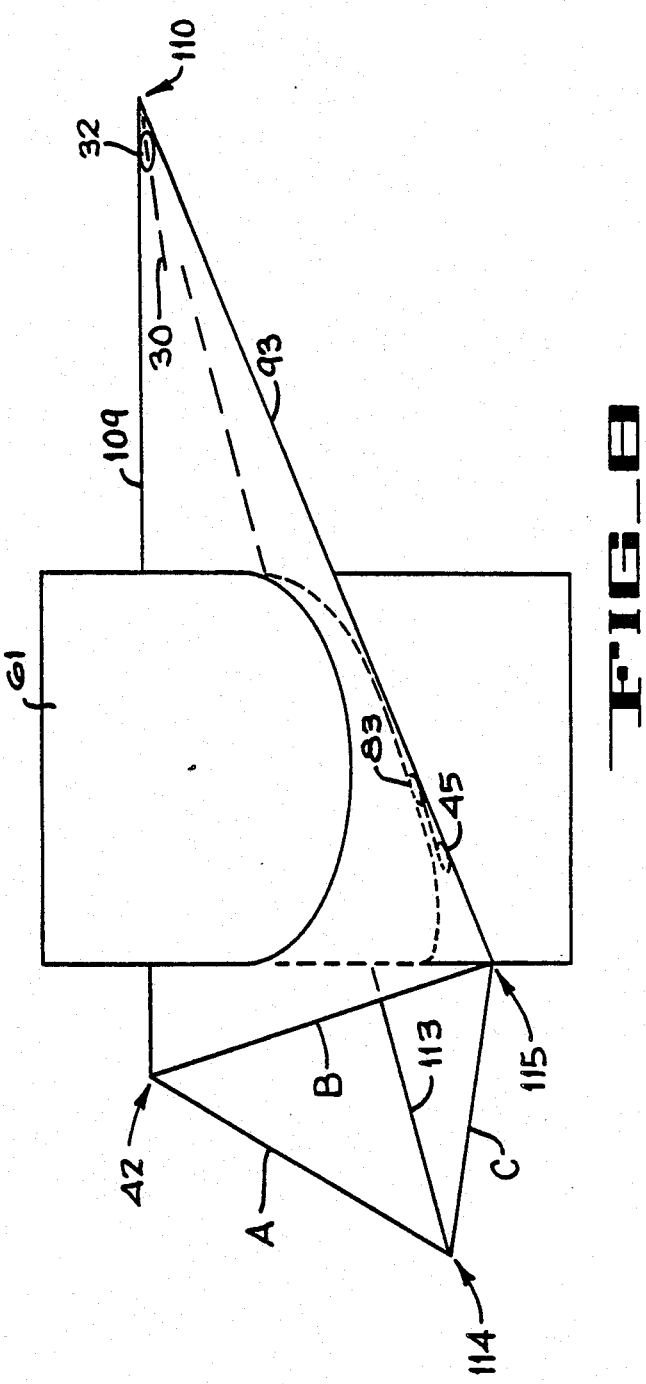

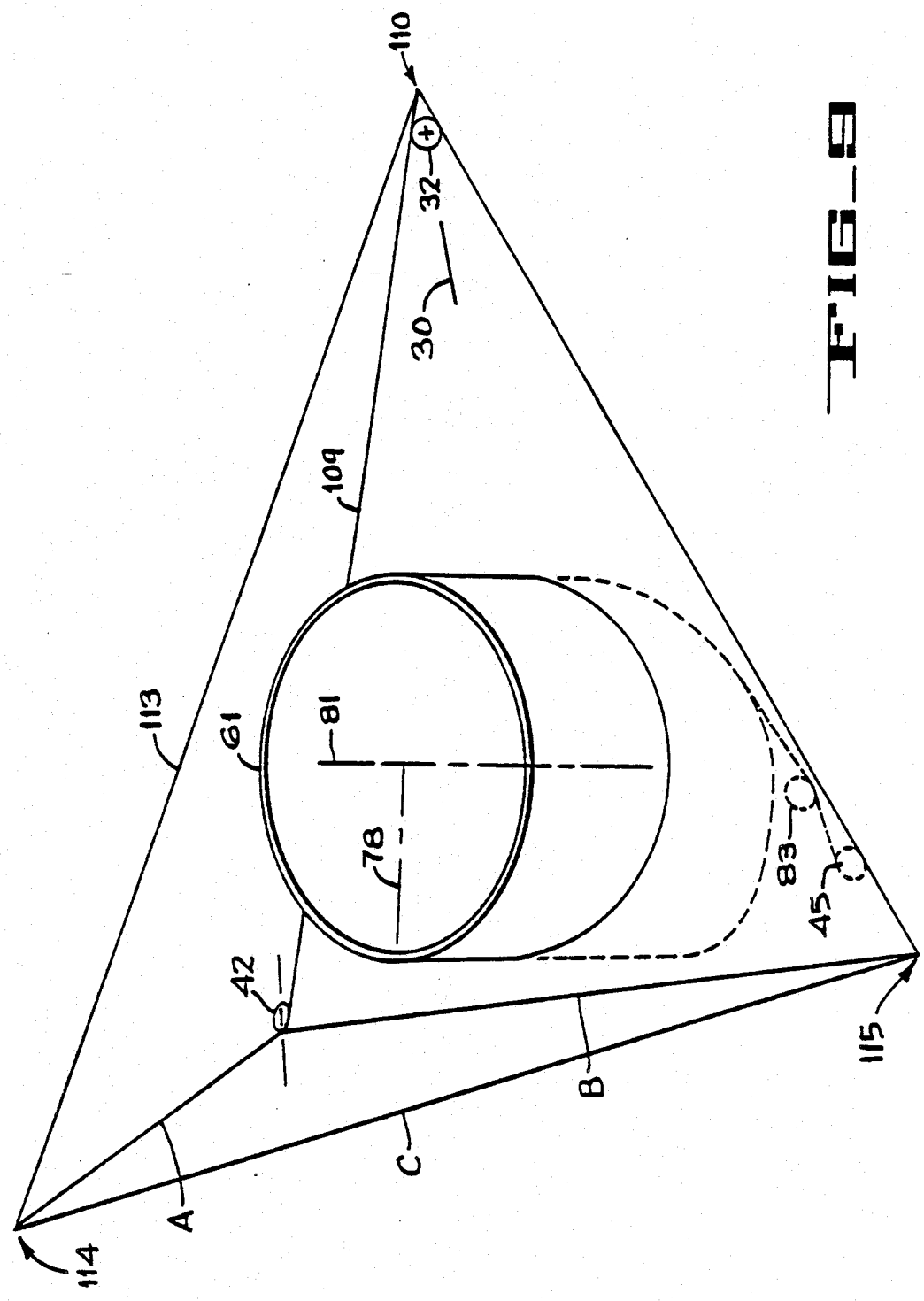

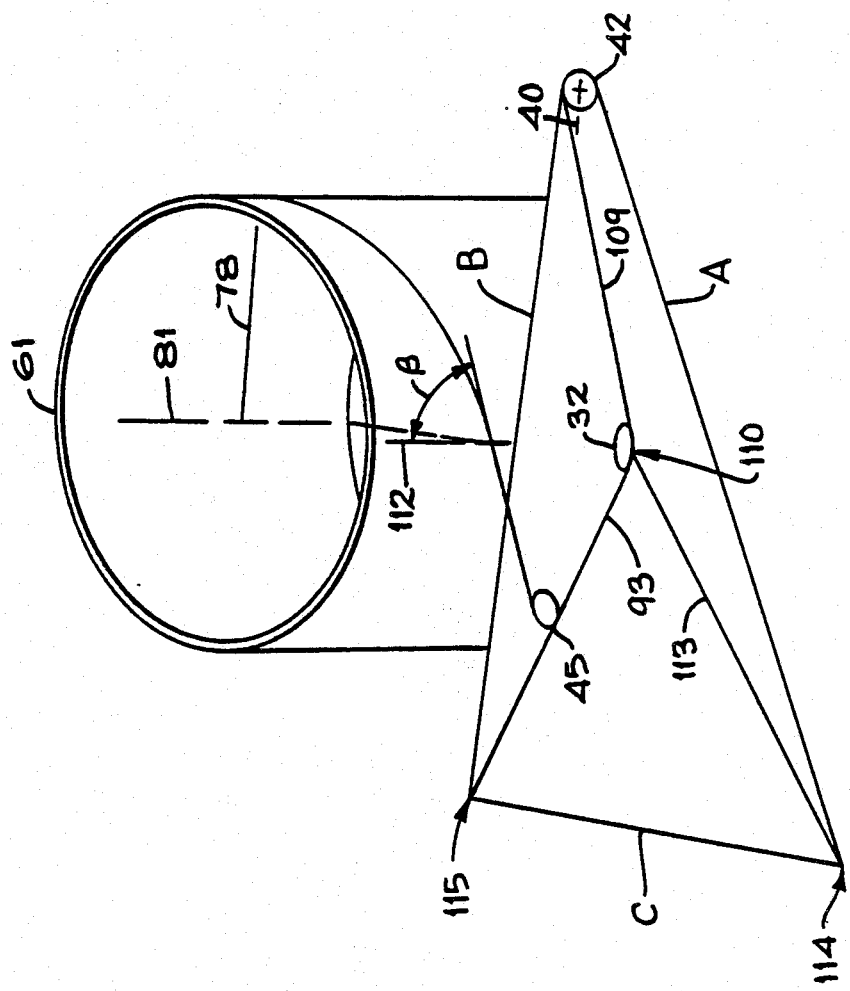

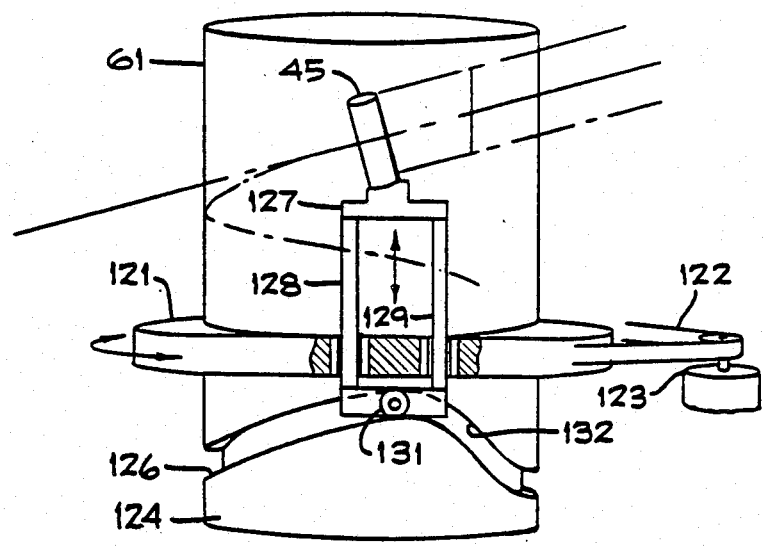
FIG_11
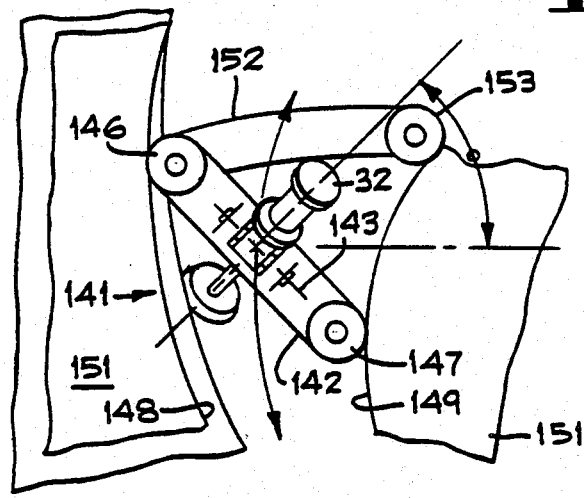
FIG_12
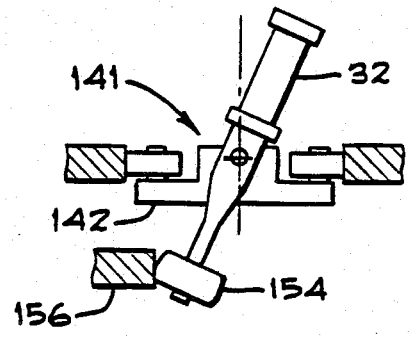
FIG_13

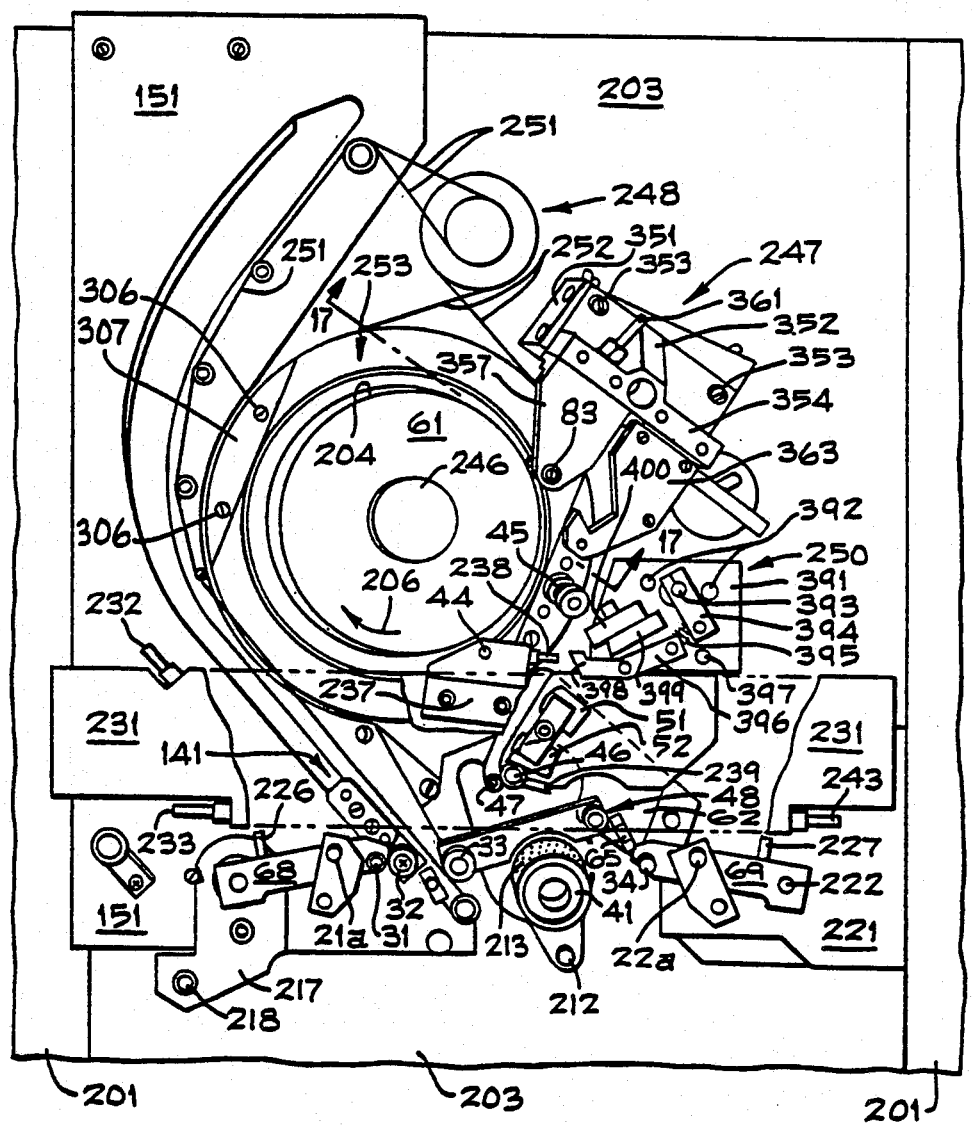
FIG_14

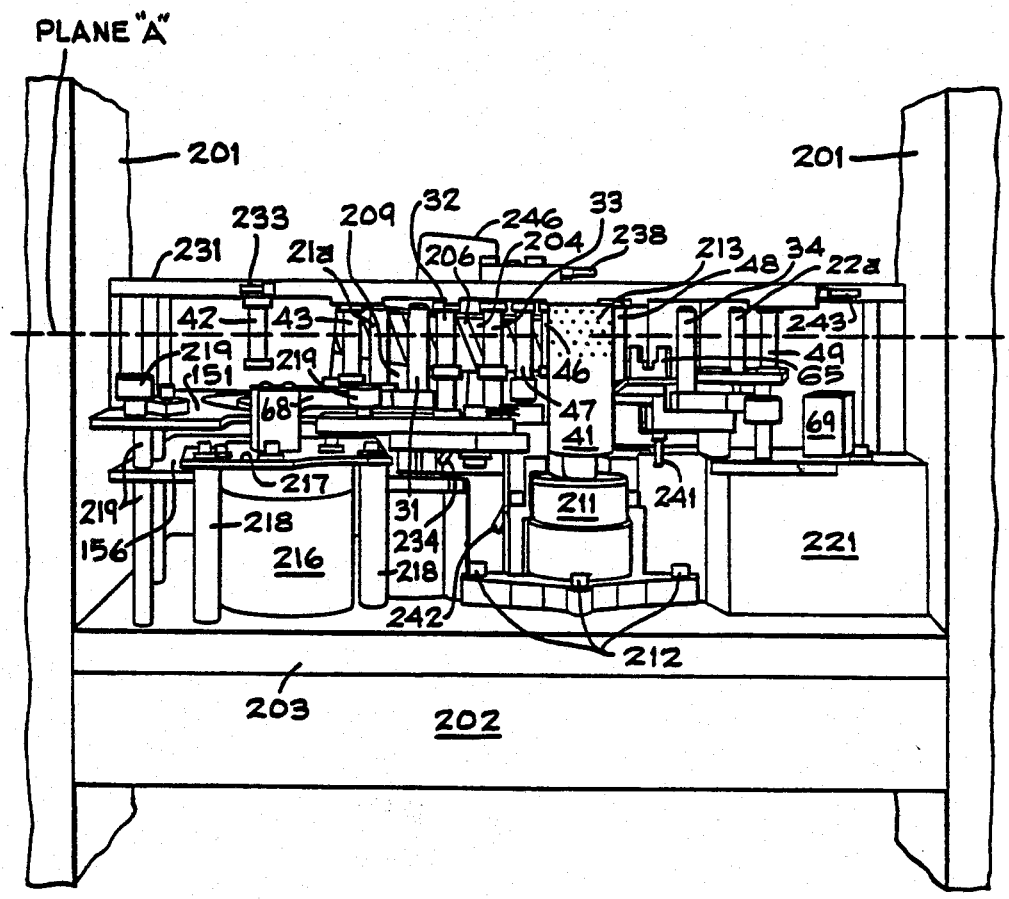
FIG_15

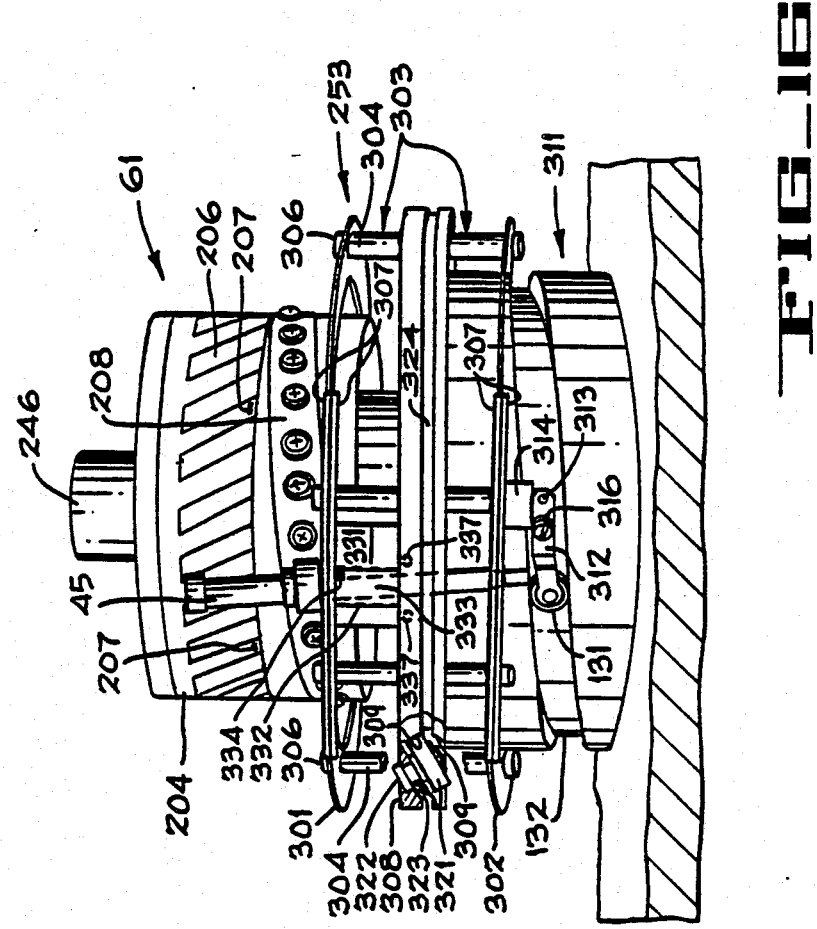

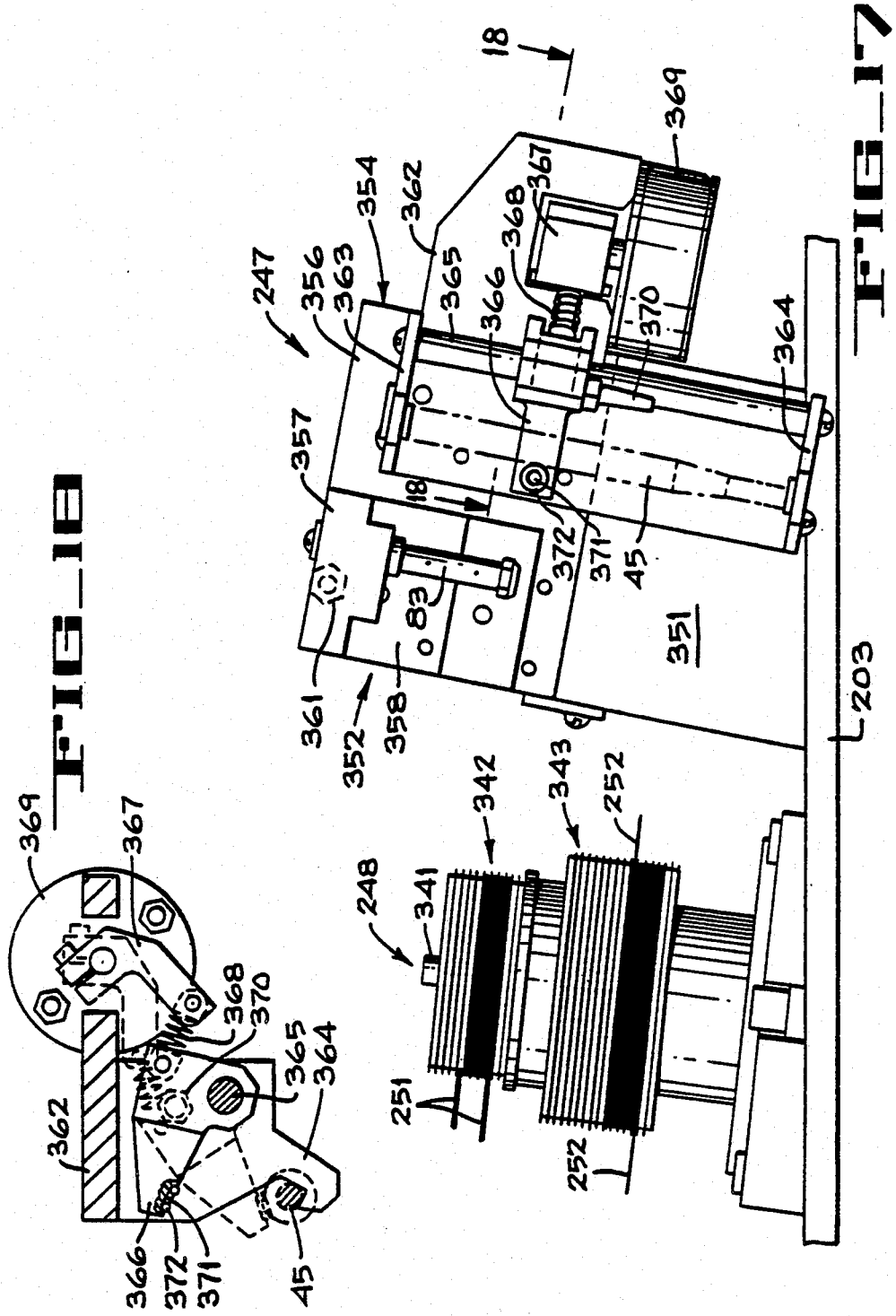

FAST DEPLOYING TAPE TRANSPORT

This invention relates to magnetic tape information storage and retrieval apparatus, and particularly to such apparatus capable of accepting magnetic tape from cassettes and arranging the tape for processing with extreme rapidity.

Magnetic tape cassettes, of the type having two reels lying in the same plane on parallel axes, are convenient for packaging, shipping, and storing tape. The cassette usually can be loaded in an operating device, such as a tape transport which would engage the tape therein to automatically "thread" it into an operating mode within the transport for processing. After the processing, which usually consists of writing or reading information on or from the tape, the tape must be rewound; or if the rewinding phase is to be postponed, the tape must be rewound just after threading the next time it is used, or at some convenient time between uses.

It would therefore be of advantage to shorten the threading time, and also to be able to begin rewinding the tape during the threading process, rather than waiting until threading is completed.

It would also be of advantage to maintain the tape under predetermined tension during fast-forward or rewind shuttling operation, which has not been attempted, so as to be able to employ a driving and "metering" (speed-controlling) capstan and fixed transducing heads engaging the oxide recording surface of the tape, to facilitate searching operations, for locating desired blocks of information, for example, or cueing, or time-code striping, or audio play.

Particularly when the cassette is used with so-called "helical scanning" drums, which need considerable time for threading, it would be advantageous to perform such supernumerary operations either during the threading operation itself, or without needing to wait for the full threading operation to be completed.

In contemporary helical-scan apparatus, it is necessary to fully thread the helical tape path in order to engage the tension control mechanisms, and the introduction of the capstan, either outside the tape loop, or as a "pop-up" inside the loop, is complicated by the use of pinch rollers, and by the fact that the oxide surface of the tape faces to the outside of the cassette.

Conversely, in contemporary apparatus of this type, the tape must be fully unthreaded and returned to the cassette for high-speed winding, so that tension and speed control, together with the possibility of longitudinal reading or writing at high speed, are completely sacrificed.

Accordingly, it would be desirable to shorten the threading time for helical-scan magnetic tape transports.

Further, it would be desirable to enable the longitudinal scanning of cassette-stored tape in a helical-scan transport to take place without waiting for the helical threading of the tape to be completed.

It would be desirable to enable the longitudinal processing of cassette-stored tape in a helical-scan transport to take place during the helical-threading phase of the threading process.

In the structure of the present invention, a capstan is arranged with a plurality of other guides and longitudinal transducing heads in a loading plane, into which the reels of a cassette are brought for loading, along axial paths that are normal to the plane, with the capstan and certain "interior" ones of the guides interposed in the tape "loop" that is defined between the reels and the run of tape extending between the reels. Certain of the guides exterior to the cassette are then moved inwardly along the loading plane to bracket the capstan and to bring a portion of the tape run into wrapping configuration around the capstan. Concurrently, certain of the interior guides are moved outwardly along the loading plane to bring another portion of the tape run into transducing relation with the heads; and at least two other of the interior guides, mounted at the ends of tensioning arms, are moved outwardly to tension the entire tape run against the heads and capstan, and to dispose a straight segment of the tape run in nearly tangential relation to (but not in contact with) the helical scanning drum, which is inclined at the desired helix angle with respect to the loading plane. In this intermediate condition, the tape may be processed longitudinally entirely in the loading plane. For helical threading, a first threading guide is obtruded into the tape loop and circulated helically around the scanning drum, inclined at the helix angle with respect to the drum, while another of the interior guides moves outwardly along the loading plane in an arcuate path around and beyond the scanning drum, inclined at changing angles with respect to the loading plane, these angles being carefully predetermined so as to maintain the tape in longitudinally transportable and processible condition, both during threading from, and unthreading to, the intermediate condition.

DESCRIPTION OF THE DRAWINGS

FIG. 8 is a schematic elevation view, taken from the side opposite that of FIG. 7, of the model of FIGS. 5-7;

FIG. 9 is a schematic oblique view, taken from above and from the same side as that of FIG. 8, of the model of FIGS. 5-8;

FIG. 10 is a schematic oblique view, taken from above and from the same side as FIG. 6, and from the same direction normal to the initial loading plane, of the model of FIGS. 5-9, illustrating a beginning portion of the helical-threading process;

FIG. 11 is a schematic perspective view illustrating the operation of one arrangement for the helical threading guide;

FIG. 12 is a schematic plan view illustrating the operation of the planar-moving helical threading guide;

FIG. 13 is a schematic elevation view of the mechanism shown in FIG. 12;

FIG. 14 is perspective plan view of an actual structure embodying the invention;

FIG. 15 is a perspective front elevation view of the apparatus shown in FIG. 14;

FIG. 16 is a cross-sectional left side elevation perspective view, to an enlarged scale, of a portion of the apparatus shown in FIGS. 14 and 15;

FIG. 17 is a cross-sectional elevation view, to an further enlarged scale, of a portion of the apparatus shown in FIGS. 14 and 15, and is taken substantially along the line 17—17 of FIG. 14; and FIG. 18 is a cross-sectional plan view to the scale of FIG. 17, and taken substantially along the line 18—18 of FIG. 17.

DESCRIPTION OF THE PREFERRED EMBODIMENT

Figure 1:
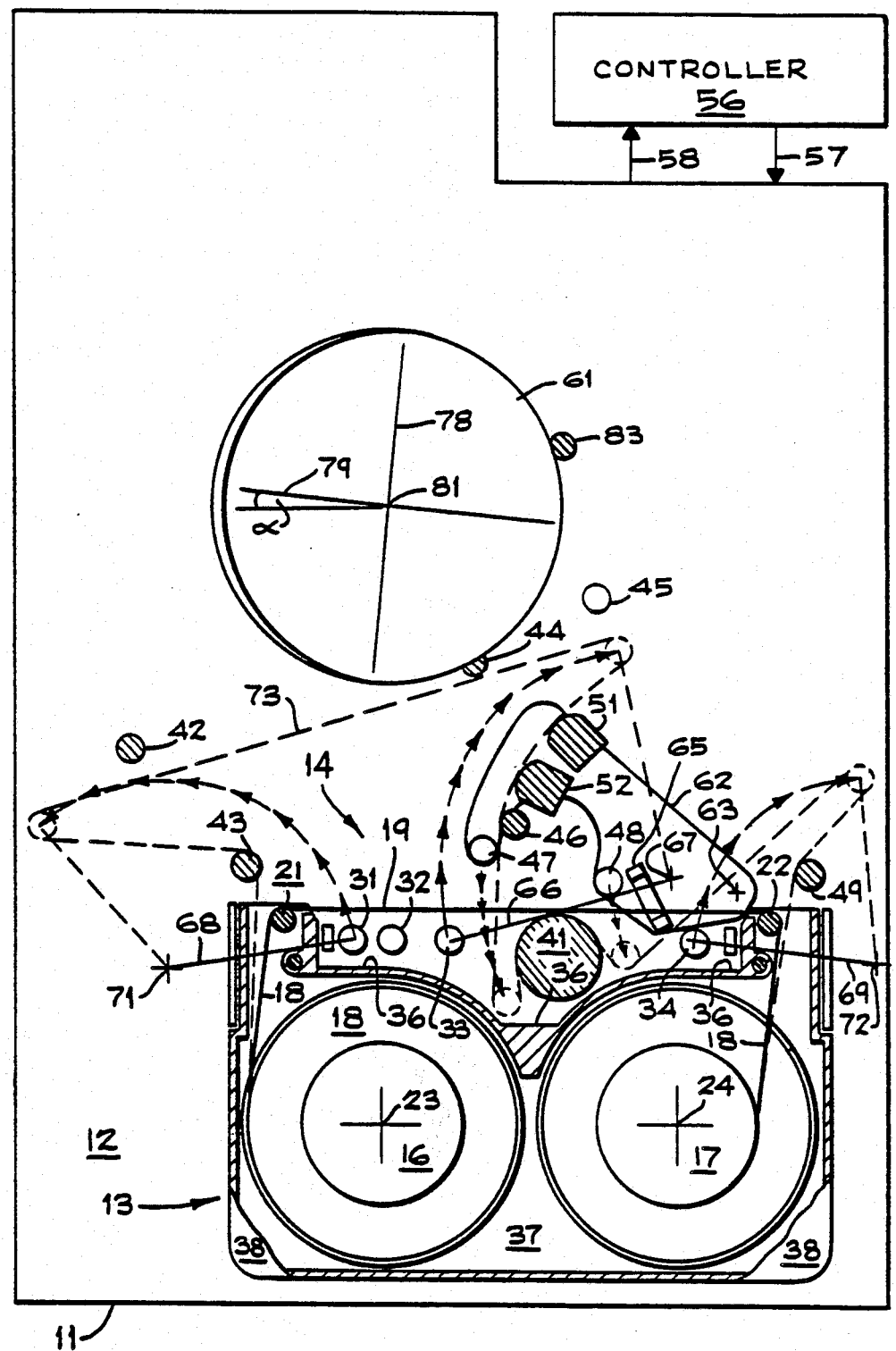
FIG. 1 is a schematic plan view tape transport mechanism incorporating a preferred embodiment of the present invention in an initial loading position.
Figure 2:
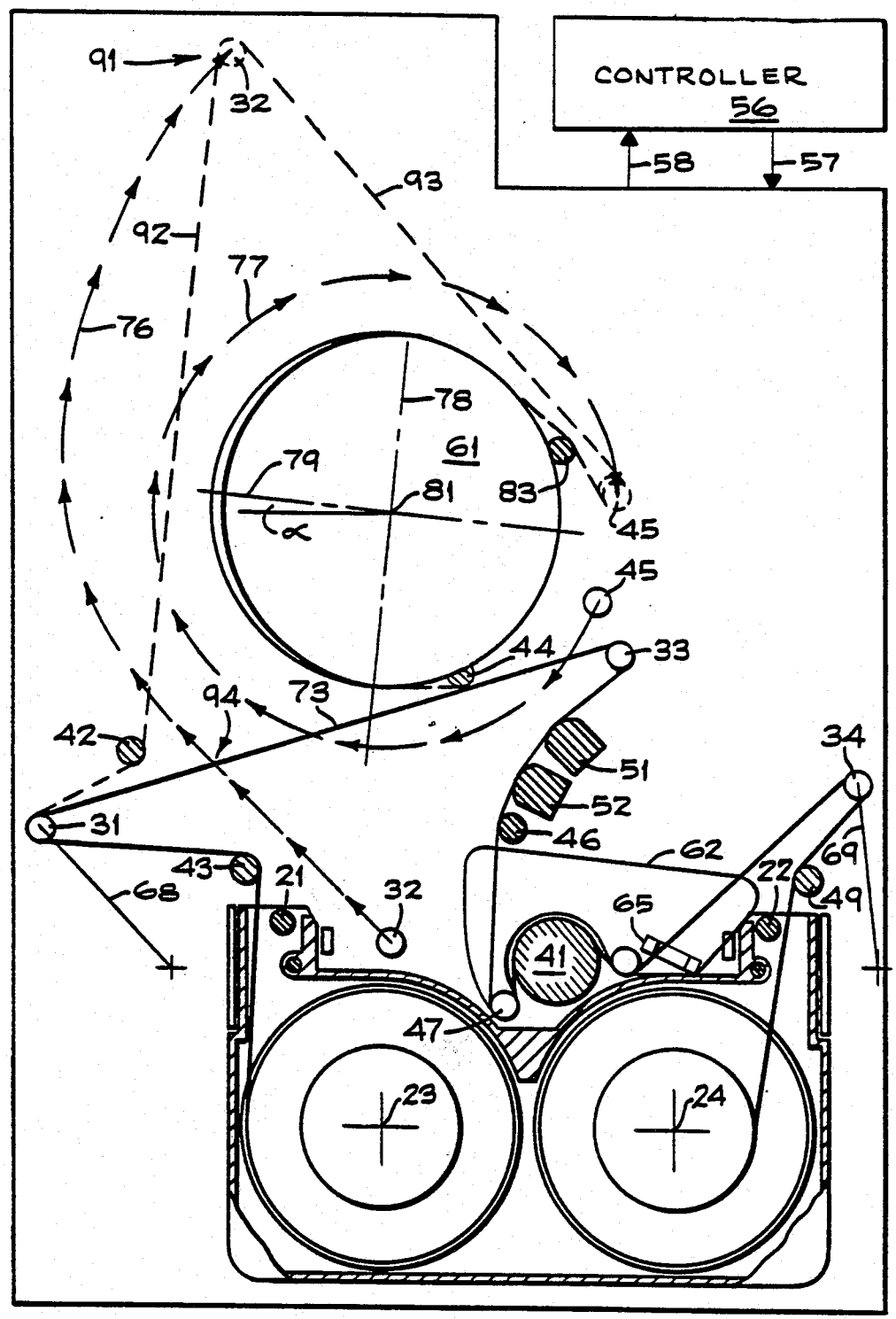
FIG. 2 is a schematic plan view showing the mechanism of FIG. 1 in the intermediate processing position.
Figure 3:
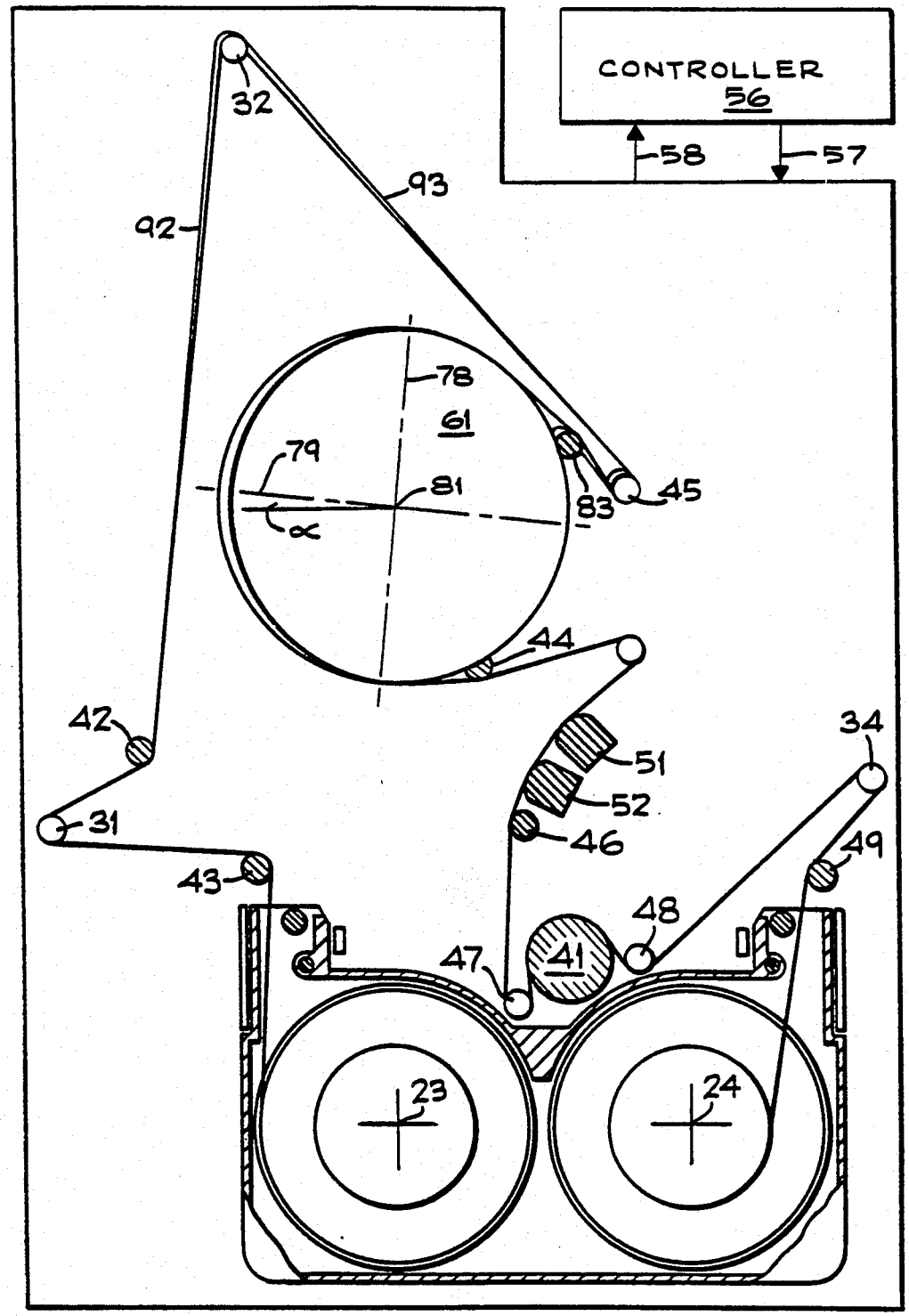
FIG. 3 is a schematic plan view showing the mechanism of FIG. 1 in the fully threaded position.

Referring now to the drawings, and particularly to FIGS. 1-3, which schematically outline the operation of the apparatus of the invention, there is shown a magnetic tape transport machine 11, and particularly a tape deck 12 consisting of a flat plate defining an initial loading plane. Upon this plate is positioned magnetic tape cassette 13, having one open side 14, and containing a pair of reels 16 and 17 upon which a magnetic tape 18 is wound, with the recording surface facing outward, and with a run 19 of tape stretched between the reels and across the open side 14 of the cassette as by means of guides, or support posts, 21 and 22.

The cassette is brought to the plate 12 by a loading apparatus, not shown, and approaches the plate along a path that is normal to the plate 12 and parallel to the axes 23 and 24 of the reels. In other words, the cassette is loaded by lowering it toward the plane of the paper, so that a number of so-called "interior" guides 31, 32, 33 and 34, which extend normally from the plane 12, are caused to obtrude into a cut-out zone defined by edges 36 of the cassette lower side wall 37. The upper side wall 38 of the cassette is shown as broken-away except at the lower corners. The cassette is retained in the illustrated position on plane 12 by means not shown, and the reels 16, 17 are coupled to tape tensioning and driving motors, also not shown in FIGS. 1-3.

It will be noted that the interior guides 31-34 obtrude into the space between the reels 16, 17 and the run 19 of tape stretched between the reels. Also obtruding into this space is a large-diameter capstan 41, which is also axially normal to plane 12. Also normal to plane 12 are a number of "exterior" elements 42, 43, 44, 46, 47, 48 and 49 and a pair of longitudinal magnetic tape transducing (reading/writing) heads 51 and 52. The capstan 41, and heads 51, 52 the guides 21, 22 and elements 42, 43, 44, 46 and 49 are crosshatched to indicate that they are fixed in position on the plane 12 during the operation of the transport, although they (except the heads) may be rotatable about their own axes. The other guides 31, 32, 33, 34, 45, 47 and 48 are all movable, as described below.

As shown in FIGS. 1 and 2, the first step to be performed in readying the tape for operation, is to engage it with the capstan and the transducing heads and to apply the tape-tensioning system for so-called "longitudinal" operation in the plane 12, but disengaged from the helical scanning drum 61. This step is performed automatically under the control of a controller 56, which produces control signals generally indicated at 57, in response to commands from an operator, and also in response to state and condition signals generated by elements of the apparatus 11 and generally indicated at 58. The controller 56 and the means producing the signals 57, 58 may all be of types well known in the art, and are not further described in this specification. The functions of the first-stage threading operation are described as follows.

First the two guides 31 and 34, which are mounted at the ends of servo-controlled tape tensioning arms 68 and 69, pivoting on axes 71 and 72 are caused to engage the inboard side of the tape run 19 and to bring the tape partly out of the cassette and to a path in contact with elements 43, 31, 48, 34 and 49. As soon as this condition is achieved, it becomes possible for the controller 56 to permit tape to be further extracted from the cassette while controlling the tape tension by response to signals from the arms 68, 69, throughout all of the subsequent threading and operating modes of the machine. The guides 47 and 48, which are mounted on a plate 62 that pivots around an axis 63, are caused to pivot (as shown by the paths of arrows leading from these guides) to an inboard position engaging the tape run 19 and bracketing the capstan 41 so as to wrap the tape around the capstan for a substantial portion of its circumference, about 160 degrees, and so as to provide the capstan with a good frictional grip on the tape, when the tape is under tension, without the need for a pinch roller. The capstan may be a vacuum-operated capstan, if desired, to further augment the gripping action.

At the same time, the guide 33, which is mounted on an arm 66 pivoting about an axis 67, is caused to engage the inboard side of the tape run 19 and to draw it outwardly and across the guide 46 and heads 51 and 52. These actions result in alignment 73, nearly tangential to but not quite touching the scanning drum 61. Thus the tape is ready for longitudinal operation, as closely as possible in readiness for helical wrapping around the scanning drum, but still entirely disposed in the plane 12, where it may be fast-wound in either direction, or transduced longitudinally by the heads 51 and 52 at normal or fast speeds in either direction, and under carefully metered speed control of the capstan 41, and carefully-maintained tension control by the servoed tension arms 68 and 69, and all as directed by the operator and the controller 56.

To assist in the winding operations mentioned above, an end-of-tape sensing device 65 (FIGS. 1 and 2) is mounted on the arm 62. The device 65 comprises a U-shaped member with upstanding arms (see also FIGS. 14 and 15) for bracketing the tape in both the open position of the arm 62 (FIG. 1) and the closed position (FIG. 2). One of the upstanding arms contains a light source, and the other arm contains a photo-sensing device which is occluded from the light source when the tape is present but produces a signal to controller 56 when the tape breaks, or when the cassette is not present, or when a transparent tape leader at either end of the tape runs between the reels.

Referring now to FIGS. 2 and 3, it will be seen that, even if the tape is still being fast-wound or transduced longitudinally, the helical wrapping phase of the threading operation can be carried out without any interruption.

To bring about the helical wrapping of the tape, it is only necessary to move the guides 32 and 45 along the paths 76 and 77 (FIG. 2) to the final positions shown in heavy black line in FIG. 3. It will be understood that the helical scanning guide drum 61 is inclined with respect to the plane 12, and at the desired pitch angle of the helical path that the tape is eventually to follow around the drum. Actually, as shown in the FIGURES, the guide drum axis 81 is tilted about an axis 78 normal thereto and lying in plane 12; the plane of tilt 79 of the axis 81 being normal to the plane 12 and oriented with respect to the plane of the reel axes 23 and 24 by an angle Alpha, of about six degrees, the actual value of angle Alpha being chosen to enable the apparatus to be fitted most conveniently into the space available.

Because the guide 44, and the guide 45 (when it first brings the tape into contact with drum 61), are arranged to be substantially normal to plane 12, it follows that they are also inclined (with respect to the drum 61) at the pitch or helix angle of the helical tape path around the drum. As will be seen below, guide 45 is mounted on a plate that is normal to the axis 81 of the drum 61, and rotates about that same axis 81. Consequently, throughout its circuit of the threading path 77, the guide 45 is constantly inclined at substantially the helix angle and is thus able to lay the tape on its helical path with the tape centerline in its passage around the guide 45 lying always in a plane that is normal to the axis of the guide 45. The extreme importance of this geometric condition will be made clear below.

Of course the guide 45, in order to move from the position indicated, outside the tape run 73, to the inside, and then to engage the inboard side of the tape run 73 and then follow a helical path around the drum 61, it (the guide 45) must start from beneath the level of plane 12 (as shown in the drawings, or alternatively from above, though this would be less convenient in the illustrated structure), and rise into plane 12 inside loop 73, and then descend again in the helical path 77 around drum 61; and mechanism to effect this function will be described further below. Suffice to say, with relation to FIGS. 2 and 3, that, at the end of the circuit for guide 45, the tape is wrapped around the drum in contact therewith for a "wrap angle" of 210 degrees and comes tangentially away from the drum to be bent around a guide post 83, which is fixed in position at the helix angle with respect to drum 61. The guide 83 is called the "entrance" any guide, and the guide 44 the "exit" guide, because during normal forward scanning of the tape, it is moving in an anti-clockwise direction (as seen in the FIGURES) around the drum 61.

While the guide 45 is making its circuit around the drum 61, the guide 32 is also caused to move along its path 76, from a position inside the cassette, and in a generally straight path to engage the inboard side of tape run 73 at a point 94 near fixed guide 42, and thence around to a final position 91, which is chosen so that the tape in its final disposition (FIG. 3) lies in two straight runs, namely, a run 92 between guide 42 and position 91, and a run 93 between position 91 and the final position of guide 45. The controlling criteria are that the tape in runs 92 and 93 should be spaced sufficiently from drum 61 to avoid frictional contact, the guide 32 should remain in plane 12 throughout its movement, and the the tape should be twisted at all times only about its centerline, but with the centerline in circuit around guides 42, 32 and 45 being always in planes substantially normal to the respective guide axes, thus fulfilling the well-known condition for keeping the tensioned tape in a "natural" path, without any tendency to climb off the end of any of the guides, particularly if they are rotatable guides. Thus, if edge guides are used to keep the tape in its correct plane in the event of sudden slackness, such edge guides cause the minimum amount, if any, of abrasion and edge wear of the tape.

It is important to recognize that the path of guide 32, from its intersection 94 with the tape run 73, could follow a straight line in plane 12 all the way to the final position 91 (in other words, guide 32 could follow the line 92 instead of the line 76), provided the guides 31 and 42 (and line 92) were located a somewhat greater distance to the left as shown in FIGS. 1–3, so that the tape run 92 did not interfere with drum 61 or guide 45. Such a geometrical arrangement would greatly simplify the tracking arrangements for guide 32, as will be seen below, but would require more space than was available in the present machine. Also a differential speed movement between guides 32 and 45 would be required, at least in the geometry shown here.

While the guide 45 has been described above as being mounted so as to be "substantially" normal to plane 12 at the point at which it first brings the tape into contact with drum 61, and has also been described as inclined with respect to drum 61 at "substantially" the helix angle at that point, and throughout its circuit of the drum, it (guide 45) is in practice mounted at an angle that represents a slight departure from the helix angle, for reasons that will be more easily understood at a later point in this description.

Figure 4:
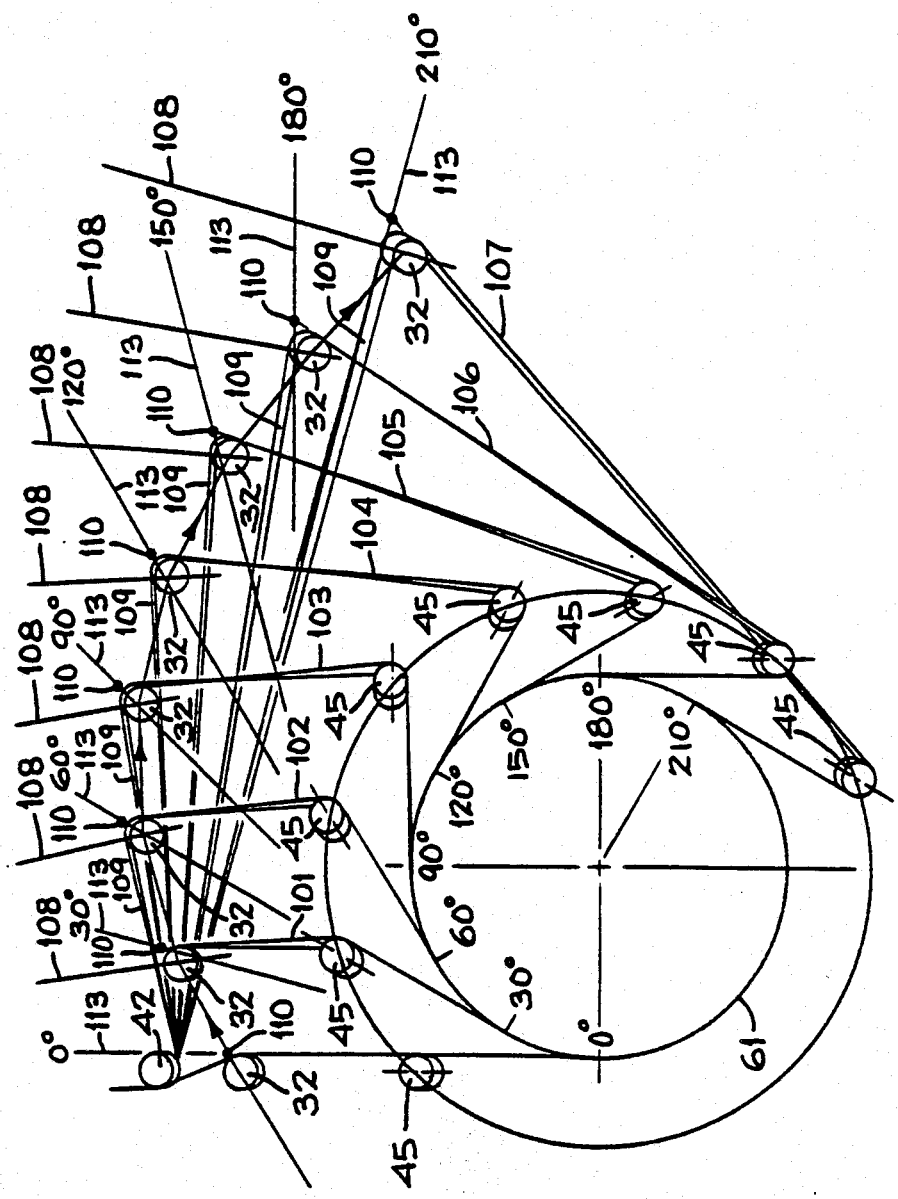
FIG. 4 is a schematic plan view, to an enlarged scale, illustrating the movements of the helical threading guides from the intermediate to the fully threaded position.

Turning now to FIG. 4, the actual positions of the guides 45 and 32 at eight angularly equispaced points of tape wrap around the drum 61 are illustrated to bring out certain other considerations affecting the choice of guide paths. It will be understood that, in order to avoid the complication of differential-speed movements of the two guides, it is desirable to move them both at constant speeds from beginning to end of the wrapping operation, and to ensure that both guides end their movements at the same time. For this purpose, they are both driven by belts or cables (described below) from the same drive motor. However, the successive positions of the two guides must be phased so that the tape runs 101, 102, 103, 104, 105, 106, and 107, between the guides 45 and 32, and between guides 32 and 42, do not have excessive twist; for as is well known, when tape is twisted, the edges are elongated more than the centerline, and the elastic limit of the edge portion of the tape must not be exceeded, or else permanent deformation, such as wrinkling or "scalloping" of the tape edges will result. The length of each tape run that is twisted must be chosen so that, for the amount of twist required, the unit deformation, i.e., elongation per unit length of tape edge, does not exceed a chosen maximum.

It will also be noted, in relation to FIG. 4, that guide 32, in following curved path 76, must constantly increase its tilt in a plane 108 that is normal to the tape centerline running between guides 32 and 42, this centerline, in effect, constituting the tilt axis of the guide 32. Furthermore, since this centerline direction is constantly changing, it follows that the guide 32 must be rotated (as seen in plan view) somewhat clockwise more and more in its carriage during the movement, while at the same time being steadily tilted more and more. This requirement for two degrees of angular control, instead of only one, is a complication that could be avoided if the path 76 is made to be straight instead of curved, for then the line of the tape centerline would be constantly pointed at the same angle toward guide 42, and control of tilt only would be needed.

In FIG. 4, it will be understood that the tape centerline between guides 32 and 42 remains in one plane, but that the tape centerline between guides 32 and 45 begins immediately after guide 45 encounters the tape (point 94, FIG. 2), to tilt in a plane that intersects the first plane along a line 113, for each of the angular positions of the guides 32, 45. It follows that the geometric intersection of the two centerlines (109 and 101-107) must fall at a point 110 that is somewhat removed from guide 32. If the guide 32 had infinitely small diameter, the point 110 would substantially coincide with the guide 32. To put the matter another way, the generatrices at which the two centerlines 109 and 101-107 become tangent to the right circular-cylindrical guide 32 would be identical if the guide had zero diameter; but because the diameter is finite, the point at which the centerline leaves guide 32 in the direction of guide 45 is thrown below the level of line 109. This effect, and a correction that must be made to accommodate it, will be more clearly described in connection with FIGS. 5-10, described below.

FIGS. 5, 6, 7, 8, 9 and 10 are drawn from a three-dimensional model that was constructed to aid the inventor in the visualization and conception of his invention. In this model, many of the angles, such as the pitch angle of the helix, are greatly exaggerated for clarity of view. However, the principles remain the same. The various guides are represented as circles on the various planes; in fact, each circle represents the plane of the tape centerline going around a guide, and the straight lines between the guides represent the tape centerline stretched between the guides. Consequently, if a guide appears to be represented by a true circle, the view of the drawing may be understood to have been taken as normal to the transverse plane of the guide; conversely, if a guide appears to be an ellipse, the view was taken obliquely to the plane of the guide. To assist in recognizing such tilted guides, the tilt axis (usually the "apparent" major elliptical axis) has been shown in each case.

Figure 5:
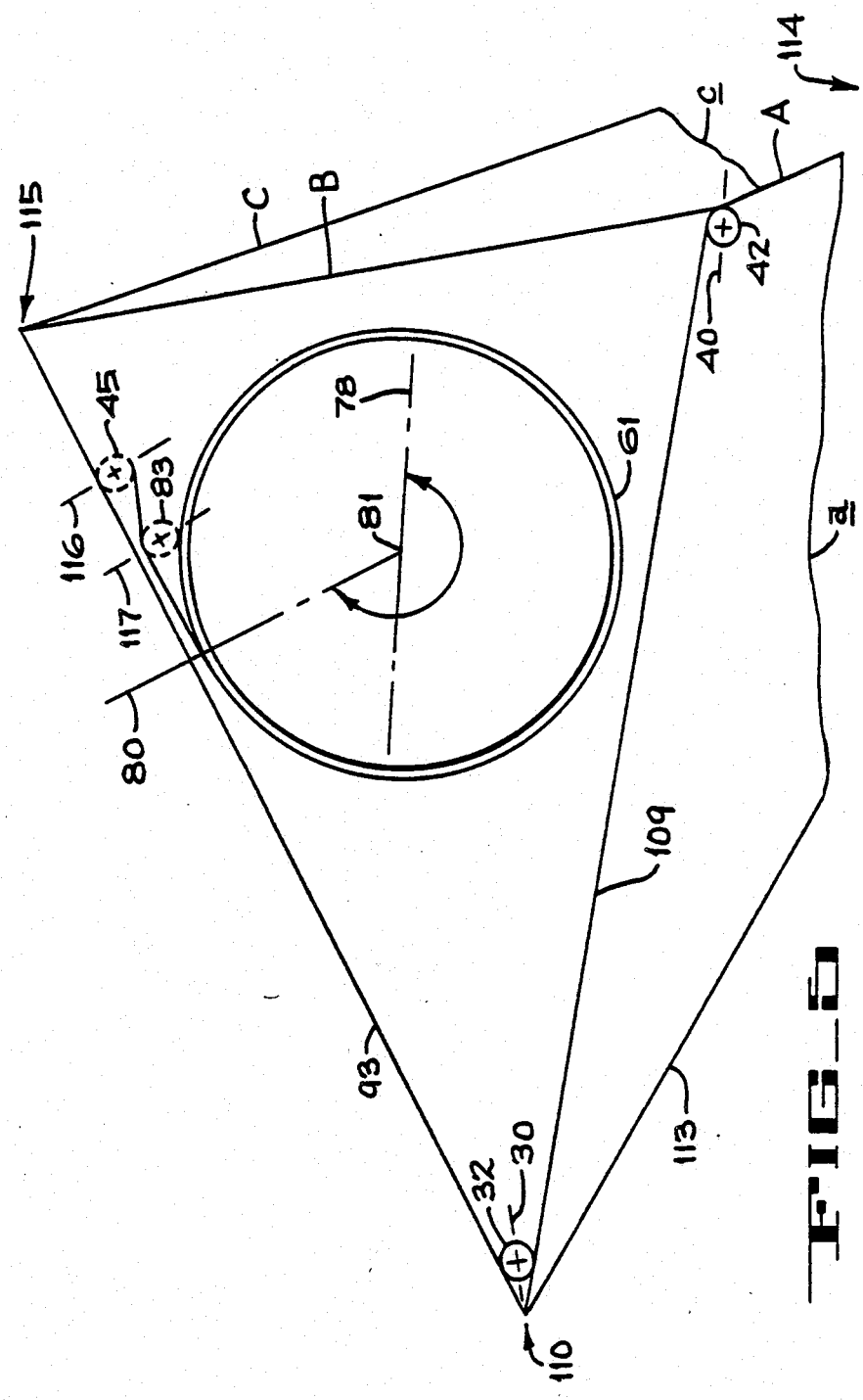
FIG. 5 is a schematic plan view, taken along the scanning drum axis, of a model illustrating the geometry of the invention.

FIG. 5 is a plan view of the model looking straight down along the axis of the helical drum assembly 61, which is here shown as a hollow right-circular cylinder. Only four of the smaller tape guides are shown, namely: the fixed guides 42, 83, and the moving guides 32 and 45. Three major planes are shown, intersecting at the point 110 to define this point as the vertex of a tetrahedron having a base ABC. The base ABC is arbitrarily selected to provide the clearest possible illustration.

Plane "A" is defined by the base line A and the vertex 110, and is the plane of the tape centerline going around guide 42 and along line 109 to guide 32; and the axis and generatrices of guide 42 are all normal to Plane "A". To preserve the largest possible scale for the FIGURE, Plane "A" is shown as broken off along a break line a, but it will be understood that this Plane continues to a base point 114 off the edge of the paper in FIGS. 5 and 6, but clearly shown in FIGS. 7-10.

All of the other tape-path-defining elements associated with the cassette 13 (i.e., guides 31, 43, 21, 22, 32, 33, 34, 44, 46, 47, 48, 49, the heads 51, 52, the capstan 41, and the reels 16, 17) are normal to Plane "A" as well, and the tape centerline going around these elements also lies in Plane "A", but these other elements are not shown in FIG. 5 for the sake of clarity of illustration.

Plane "B" is defined by the base line B and the vertex 110, and is the plane of the tape centerline going around guide 32; and the axis and generatrices of guide 32 are all normal to Plane "B".

Figure 6:
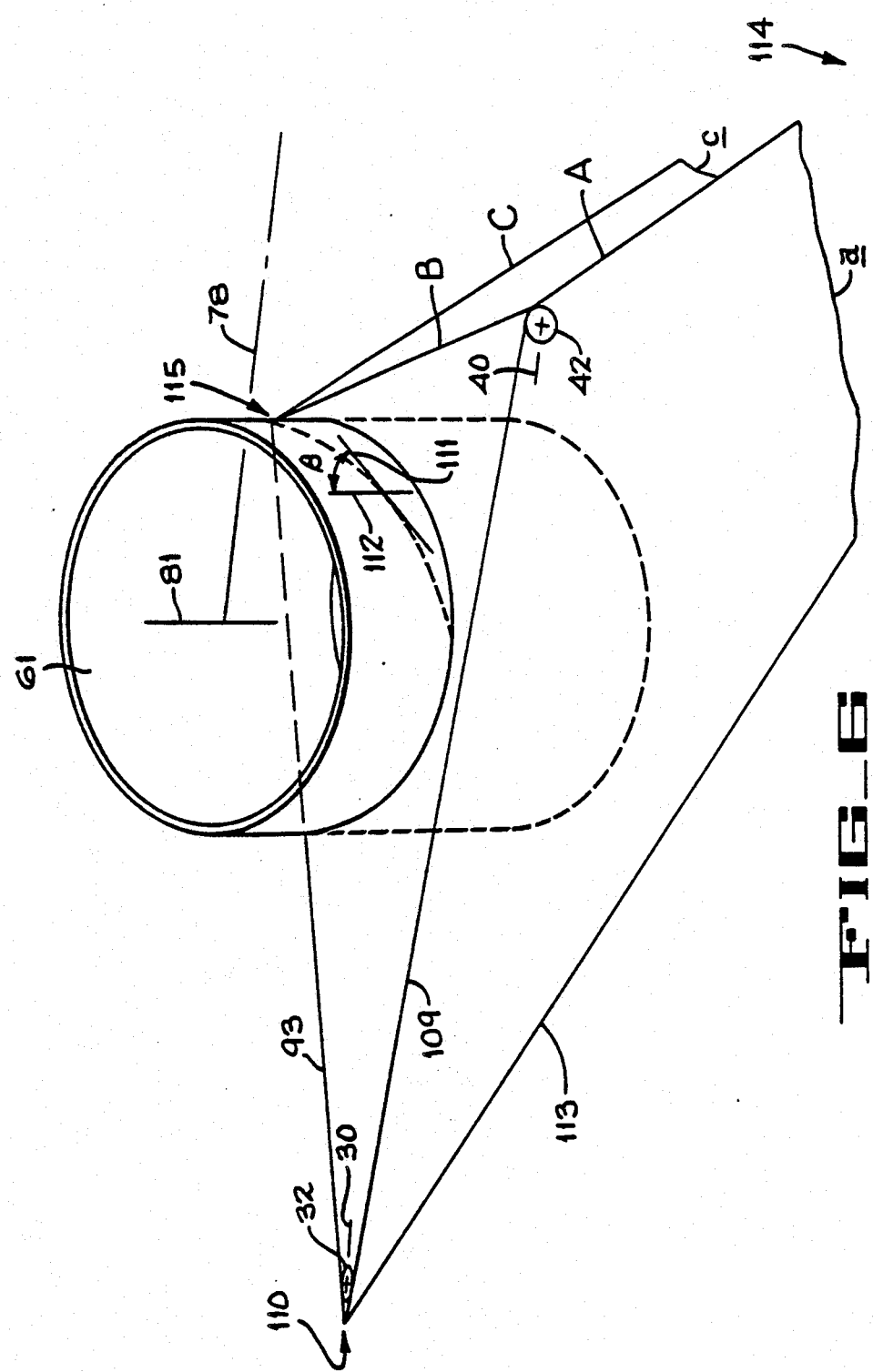
FIG. 6 is a schematic view taken normal to the initial loading plane, of the model of FIG. 5.

Plane "C" is defined by the base line C and the vertex 110, and is the plane of the tape centerline going around the guide 45; and the axis and all generatrices of guide 45 are normal to Plane "C". In FIGS. 5 and 6, Plane "C" is also shown as broken off along a break line c, but it will be understood that Plane "C" actually continues to meet Plane "A" along line 113 and at point 114 thereon, as shown in FIGS. 7-10.

For completeness' sake, it should be mentioned that Planes "A" and "B" intersect along line 109, while Planes "B" and "C" intersect along line 93 and at a base point 115 thereon. While the faces of the tetrahedron represented by Planes "A", "B" and "C" are shown as solid sides, the fourth face bounded by lines A, B and C is shown as open, and the tetrahedron as hollow.

When guide 45 is in its terminal (fully-threaded) position, as shown in FIG. 5, then Plane "C" is also the plane of the tape centerline going around the fixed guide 83; and the axis and generatrices of guide 83 are also normal to Plane "C".

It will be understood that Plane "A" is perpetually fixed, in position and inclination, with respect to the drum 61. Plane "A" is tilted on an axis 78, which is a diameter of drum 61 going through the point at which the tape centerline is tangent to drum 61 on the cassette (exit) side; and the angle of inclination of Plane "A" to the drum generatrix at this point is the helix angle Beta. Because guide 42 is perpetually fixed on plane "A" and normal thereto, it follows that the illustrated tilt axis 40 for guide 42 is parallel to diameter 78 of the drum 61.

Likewise, a drum 61 diameter 80, that passes through the point at which the tape centerline is tangent to the drum on the "entrance" side, is taken as the tilt axis of Plane "C" (FIG. 5), the tilt angle of the plane with respect to the drum 61 generatrix at this point also being the helix angle Beta. And, because guides 83 and 45 in this FIGURE are both normal to Plane "C", their tilt axes 116 and 117 are shown as parallel to axis 80 (the guides 83 and 45 are shown in phantom because they lie beneath Plane "B" in this FIGURE).

However Planes "B" and "C" must be understood to vary in position and inclination throughout the helical-threading process, as will be more fully explained below. It is only at the end of this threading process that guides 32 and 45, and their associated Planes "B" and "C", occupy the dispositions shown in FIG. 5.

One further observation may be made with respect to FIG. 5: the tilt axis 30 of the guide 32 is shown as substantially bisecting the angle between lines 93 and 109.

FIGS. 5-10 were chosen to be orthogonal to the planes of the major tape-path-defining elements, in such a way that each of these elements has at least one view showing it in true plan or elevation, with the other elements arranged in their various tilted relationships thereto. In this sense, FIGS. 5-10 may be used as a substitute for the three-dimensional model from which they were taken, which if physically present could be turned around and around for study. The model is essentially only an irregular tetrahedron defined by point 110 and base ABC, and pierced through two faces by a right-circular cylinder. FIGS. 5-10 should therefore be compared point-for-point and plane-for-plane, until a full understanding of the geometric relationships is arrived at.

FIG. 6 is of course an oblique view showing the top of the drum 61 from above, as in FIG. 5, but rotated somewhat away from the viewer, and the bottom of the drum 61 rotated somewhat toward the viewer. In particular, this view is taken substantially normal to Plane "A" (looking straight down toward the Plane). Consequently, guide 42 shows as a true circle, and guides 32 and drum 61 as foreshortened ellipses. Guides 83 and 45 cannot be seen in this FIGURE. The helix angle Beta is also illustrated for an intermediate point along the helical tape centerline path (dashed line) around drum 61. The angle Beta is defined between the common tangent 111 (to the centerline path and to the drum 61) at the point of consideration, and the drum generatrix 112 at that point.

Figure 7:
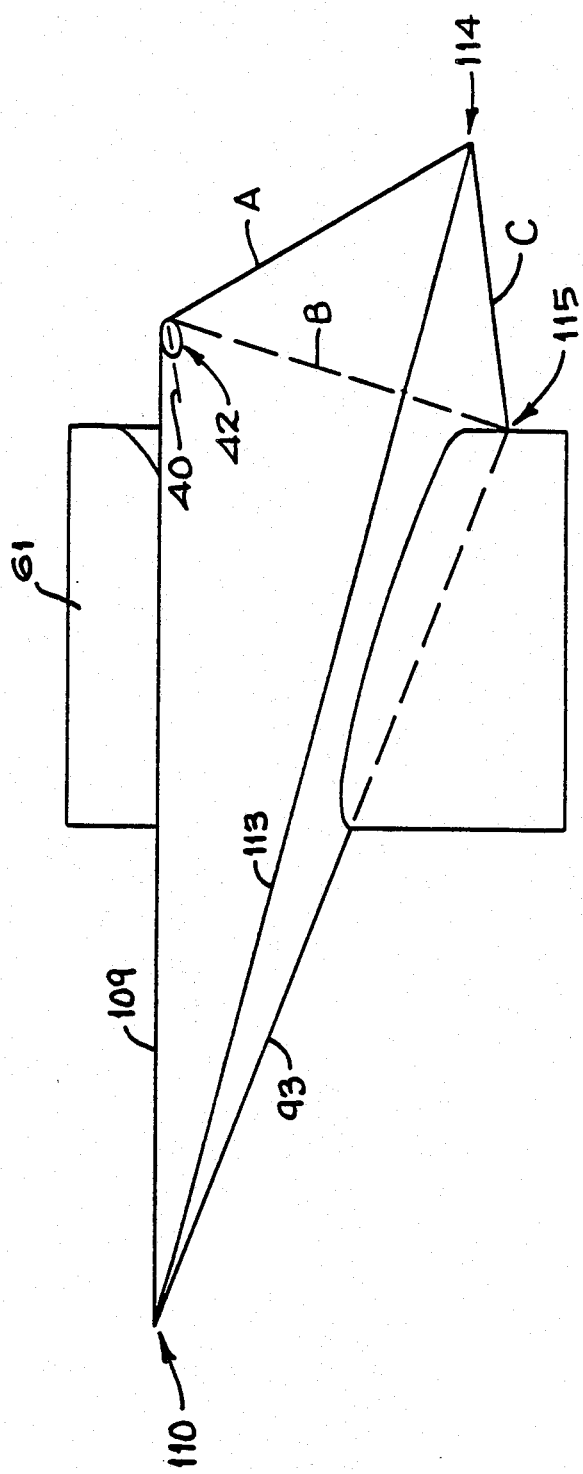
FIG. 7 is a schematic elevation view, taken normal to the drum axis, of the model of FIGS. 5 and 6.

FIG. 7 shows the model further rotated to bring the drum 61 into true elevation view. Point 114 is now clearly visible, but base line B is shown in phantom because it is hidden behind Planes "A" and "C". Only guide 42 is visible in this FIGURE.

FIG. 8 is taken in elevation directly on the opposite side from FIG. 7. All the base lines A, B and C are now visible, as well as guide 32; but guides 83 and 45, which lie on Plane "C", are shown only in phantom because they are obscured by Plane "B". Guide 42 is not visible, on the far side of Plane "A", but is indicated generally by an arrow 42.

FIG. 9 is taken from the same side as FIG. 8, but obliquely from above as well. The FIGURE is particularly taken normal to Plane "B", so that guide 32 shows as a true circle; but guide 42 is foreshortened, and guides 45 and 83 (shown in phantom again) are foreshortened as well.

FIG. 10 is a view projected at the same angle as FIG. 6, that is, from the upper left side of the model, and normal to Plane "A", but showing the apparatus in an intermediate stage of helical wrapping action: namely the 90-degree stage corresponding to that shown in FIG. 4. While the visible portion of Plane "A" seems quite small, it still may be seen to be bounded by line A and by lines 109 and 113, and to meet the vertex 110 and base point 114. The base point indicated at 42 in FIGS. 5-9 is shown distended into a circular arc so as to show guide 42 as included in the portion of the Plane that is shown. It will be understood that the line A is arbitrarily selected, and is particularly selected to help the clarity of the illustration only. Likewise, Plane "B" is shown as bounded by line B, line 109, and line 93, and includes guide 32. Plane "C" is shown as bounded by line C and by lines 93 and 113. However, it was necessary for consistency to show guide 45, which in fact is co-planar with Plane "C", as lying on the far side of line 93. It should therefore be understood that guide 45 as shown, lies in an extension of Plane "C", and not in Plane "B".

It will be noted, particularly in FIG. 8, how the finite diameter of guide 32 causes a dropping of the centerline line 93, which is also the line of intersection between Planes "B" and "C", so that it extends from the point 110, exterior to the guide 32, as previously mentioned. Likewise, the center point of the guide (i.e., the point at which the guide axis passes through the Plane "C") also is caused to drop out of Plane "A". Consequently, if the carriage (described below), that moves guide 32 along its threading path, moves in a plane parallel to Plane "A", a guide elevation error can result. This error can be minimized by causing the guide 32 to tilt about an axis below the centerline level, so as to introduce a "cosine factor", resulting in a compensating error in the opposite direction. The net error in an actual apparatus embodying the invention (see FIGS. 14 et seq.) amounts to only 0.013 inches over the total guide travel. This net error could be further reduced by tilting the plane in which the guide carriage travels, but it has been found satisfactory to merely shift the nominal elevation of the carriage tilt axis so as to distribute the error equally (plus and minus) over the entire travel dimension. Because the resulting error value of plus/minus 0.0065 inches is within normal machining tolerances, there is no perceptible disturbance of the smooth threading operation, even when the tape is running longitudinally while being helically threaded.

One other accommodation, previously touched upon, is required at the end of the movement of guide 45, when it approaches and passes the fixed guide 83. If the guide 45 is mounted to run too exactly at the helix angle Beta all around the drum 61, then when it moves another ten degrees beyond the guide 83 to its final position, it will not be strictly axially parallel to guide 83; or, in other words, guide 45 will be tilted about an axis 116 (FIG. 5) that lies in Plane "C", as it should, but that is not parallel to the tilt axis 117 of guide 83, as it ought to be, in order to keep the tensioned tape on the so-called "natural" path during operation, without tending to climb off the ends of any of the guides, even those with no flanges, and also without substantial frictional abrasion against the flanges of guides that have them.

Such a problem can be solved by mounting the guide 45 in its carrier so as to have ten degrees of extra rotation. Other complex structural solutions are also possible. However, in the present invention, a slight bias in the alignment of the guide 45 is tolerable during the helical threading process, so long as the guide alignment is substantially correct after it arrives in its final position and during protracted helical-scanning operation of the apparatus.

Accordingly, the present invention contemplates mounting the guide 45 so that it is strictly normal to Plane "C" in its final position, and thus strictly axially-parallel to guide 83, with the result that it is slightly axially-inclined with respect to guide 83 when it is passing guide 83 ten degrees earlier in its path of rotation around drum 61. This means that at the instant of passing guide 83, and actually throughout its rotation from initial contact with the tape, guide 45 is inclined, not exactly, but effectively at the helix angle Beta. In this use, the term "effecting" means "without making any material difference in the operation of the apparatus".

One possible variation of the above described geometry is to place the guide 42 upon the line 113 (see FIG. 5), which is the line of intersection between Planes "A" and "C". This disposition would result geometrically in Plane "B" becoming identical with Plane "C", with the practical result that all of the twist would take place between guides 42 and 32, and none between guides 32 and 45. However, such an arrangement would require more space in Plane "A" than the illustrated arrangement. Also, the "unit deformation" (previously mentioned) of the twisted tape edges must be greater in such an arrangement than in that of FIGS. 1-10, because the total amount of twist must be concentrated in a shorter total length.

FIG. 11 illustrates one possible arrangement for moving the guide 45 around the drum 61. A rotating plate 121 is mounted to rotate on the same axis as the drum 61, and is driven by a cable or belt 122 and motor 123 (which also drives a cable or belt for moving the guide 32, not shown in this FIGURE). Below the drum 61 is fixed a cam element 124, having a cam groove 126 formed therein, which for most of its circuit is helical, at the same pitch as the helical track of the tape. The guide 45 is mounted upon a parallel-motion slide 127, having two rails 128, 129, which ride snugly but slidably in corresponding openings in the plate 121; and the lower end of the slide 127 is provided with a cam-follower tracking wheel 131 that rides snugly in the groove 126. The groove has a downwardly-curving beginning portion 132, which permits the guide 45 to stand-by, during loading of the cassette, in a position below the initial loading plate 12, and then to come up behind the run 73 (FIGS. 1 and 2) as the helical wrapping portion of the threading process begins.

FIGS. 12 and 13 illustrate the structure of a carriage 141 for the guide 32. An elongated carriage plate 142 is provided to mount the guide 32 for tilting action on an axis 143 parallel to the length of plate 142. The plate 142 has a pair of flanged tracking wheels 146, 147 at its extremities, riding on a pair of generally diverging curved rails 148, 149 that are formed as the edges of an opening in a plate 151 that is mounted in the apparatus parallel to the initial plane 12. The carriage 142 is retained between the rails 148, 149 by means of a second elongated plate 152 that is pivotably connected to plate 142 on the same axis as that of wheel 146, and carries a third flanged wheel 153 at the other end, riding on the rail 149. The combination is spring loaded to "jacknife" the plates 142, 152 toward one another, thus to keep the generally triangular arrangement wedged snugly between the rails as they diverge or converge, depending upon the carriage position. Thus the guide is rotated so as to keep the line of the tape centerline, which is normal to the tilting axis 143, always pointed toward the guide 42. Tilting of the guide at the correct angle is controlled by a wheel 154, rotating coaxially on a downward extension of guide 32, and springloaded against a third appropriately curved rail 156.

DETAILED DESCRIPTION

It is to be understood that FIGS. 1-13 illustrate the structure of the invention somewhat schematically, for the sake of clarity in describing the geometrical and other relationships between parts. To complete the description in greater detail, FIGS. 14-19 have been chosen to show the precise structural details of the mechanism.

Referring particularly to FIGS. 14 and 15, the parts as numbered in FIGS. 1-3 are shown in their actual forms and relative dimensions. The FIGURES are not strictly orthographic, but are perspectives, FIG. 14 being taken substantially in plan, and FIG. 15 substantially in front elevation. The controller 56 is not shown, nor the cassette 13, but the guides 21, 22 of the cassette are represented by a pair of support posts 21a, 22a that are mounted as part of the actual structure of the transport for use with a test cassette of modified structure; but the posts 21a, 22a may be removed when the transport is used with an actual cassette 13 as shown in FIGS. 1-3. The structure for introducing and ejecting the cassette 13 is not shown, either. The transport is shown mounted in a rack-type structure comprising a pair of side panels 201, a cross-brace member 202, and a base plate 203, which is not identical with, but is parallel to, the plate or plane 12 of FIGS. 1-3, and to the schematically illustrated Plane "A" of FIGS. 5-10. Plane "A" was of course the plane corresponding to the centerline of the tape in its monoplanar arrangement (FIG. 2), and is illustrated schematically in FIG. 15 at substantially eye-level, considering that the FIGURE is a perspective rendition.

The drum 61 is shown in FIGS. 14-15 as mounted at the helix angle on the base plate 203, with a rotating upper portion 204 having shallow helical grooves 206 directed diagonally across the tape path so as to pump air toward the tape centerline from the upper edge of the tape to provide an air-bearing film for the tape of carefully controlled thickness. The upper drum portion 204 rotates in clockwise direction (arrow 206, FIG. 14), opposite to the direction of tape motion during helical-scan "forward" operation. A number of transducing heads, such as the head 207 (FIG. 16) are mounted on the upper rotating drum 204, and a helical flange 208, best shown in FIG. 16, is affixed to the lower, non-rotating portion 209 of the guide drum structure 61 for supporting and guiding the lower edge of the tensioned tape in its helical path around the drum structure 61.

For a comparative enumeration of the structural elements, we start at the base plate 203 (FIG. 15). A capstan motor 211 is affixed to the base plate 203 by means of bolts 212, and the tape-engaging portion of the capstan 41 is provided with an array of openings 213 for application of vacuum suction to the back of the tape for increasing the driving grip thereon, as described.

The suction or pressure differential, may be applied to the openings 213 as by means of interior passageways arranged in any of several ways known in the art, not here shown.

A motor 216 is mounted in suspension from a plate 217 that is in turn mounted on the base plate 203 by means of legs 218, and the arm 68, bearing guide 31 is coupled to the shaft of the motor; and the arm 68 is protected at either end of its arc of motion by rubber bumpers 219 that are mounted on the plate 151, which, along with the lower guide plate 156 (FIG. 12), is mounted on the base plate 203 by means of legs 219. A mounting block 221 is also mounted on the base plate 203 to support a motor 222, on the shaft of which is mounted the arm 69 bearing the guide 34.

In the structure shown in FIGS. 14-19, all of the tape guides (except guide 45 during threading only) are air lubricated for floating the tape substantially frictionlessly on a pressurized air film. For guides 31 and 34, the air is supplied through hoses (not shown) coupled to respective input nozzles 226 and 227, and thence through interior passages (not shown) within the respective arms 68 and 69, and within the guides 31, 34, which have numerous tiny surface openings, too small to be portrayable in FIGS. 14-19, communicating with the interior passages in the zones covered by the tape during operation. All of these openings and passages may be of forms known in the art and are not here shown.

Also shown in FIGS. 14 and 15 are the various other guides and elements shown in FIG. 1, including guide 42, which is mounted to depend from a bridge member 231, and which is supplied with air from a hose not shown and a nozzle 232; also guide 43 depending from bridge 231 and supplied with air through nozzle 233; also guide 32, which is supplied with air from a nozzle 234; also guide 33 supplied with air through a nozzle (not visible in the FIGURE); also guide 44, which is suspended from an adjustable mounting block 237 mounted on the bridge 231, and has an air nozzle 238; also guide 46, supplied with air through nozzle 239; also guides 47 and 48, supplied with air through a nozzle 241; also an air/suction nozzle 242 for the capstan 41

(FIG. 15); also an air nozzle 243 for the guide 49; also the heads 51, 52.

Also shown in FIGS. 14 and 15 is a stationary central cap 246 for the scanning drum structure 61, from which leads (not shown) may be taken out for connecting the rotary heads and other circuits to the controller; a massive mounting block 247 for mounting the guide 83 and for locking the guide 45 precisely in its final position and supplying lubricating air thereto, which will be described in greater detail in reference to FIGS. 16 and 17 below, as will also a locking means 250 for the guide 33; and a driving pulley 248 and wire-strand belts 251 and 252, respectively for the carriage 141 of guide 32 and for a mounting-ring structure 253 for the guide 45, which structures are somewhat different from those of FIGS. 11 and 12, and will be described in greater detail in connection with FIG. 16 below.

Referring to FIG. 16, the drum assembly 61 is shown, with the mounting arrangement for guide 45, as if isolated from the remainder of the apparatus shown in FIGS. 14 and 15, and also as if rotated about 180 degrees from the position shown in FIG. 14, for clarity of illustration.

The structure of FIG. 16 is different from that schematically illustrated in FIG. 11, in that a parallel motion linkage mechanism 253 is added to further ensure the maintenance of the correct inclination angle in the guide 45 as it moves vertically while circuiting the drum assembly during helical threading of the tape.

This linkage includes a pair of springy beryllium copper rings 301 and 302, which are mounted in parallel as by means of six angularly spaced brackets 303 each comprising a spacing sleeve 304 between the rings, and a bolt 306 holding the two rings and sleeve together. Two of the brackets 303, on either side of the guide 45, also secure a pair of rigid clamping plates 307 for each ring 301, 302, so that in the vicinity of the guide 45 the rings are never flexed, but remain perpetually normal to the axis of the drum assembly 61. Another double set of plates 307 is provided for the pair of brackets 303 diametrically opposite to the pair shown in the foreground in FIG. 16, but the farther brackets are behind the drum assembly 61 and are consequently not visible in FIG. 16, although they may be seen in plan view in FIG. 14. This farther pair of brackets 303 serves also to mount the ring assembly solidly to a rotating ring mount 308, while the foreground brackets 303, and the two flanking brackets to be seen in FIG. 16, are arranged to pass freely through bores (not shown) in the rotating ring member 308.

To mount and guide the ring member 308 in rotation, a set of four upwardly-inclined and four downwardly-inclined running wheels 309 are mounted on the inner periphery of the ring 308, and are angularly spaced and alternately arranged (upwardly and downwardly inclined) around the periphery, so as to engage and run on a pair of upwardly and downwardly inclined track surfaces 309 formed in a mounting drum member 311, which in turn is mounted on the base plate 203. The member 311 contains the guide groove 132 in which runs the guide wheel 131 for controlling the elevation of the guide 45. The wheel 131 is cantilevered on an arm 312 that pivots vertically on a pin 313 extending from a base member 314 into which one of the bolts 306 is threaded; and the arm 312 is locked in a chosen adjusted position by means of a clamping screw 316 threaded into the member 314. The axes of wheels 309 are each inclined at about 30 degrees to the vertical and the wheels are mounted as by means of ballbearing races 321 on shafts 322, which in turn are fixed in conforming bores in the ring member 308 as by means of set screws 323. The ring member 308 has a peripheral groove 324 which serves as a seat for several turns (not shown in FIG. 16) of the wire-strand cable 252, by which the guide 45 is driven in rotation from driving pulley 248 (FIG. 14).

Of great importance in the mounting of guide 45 is the structure for gauge-mounting and adjusting the precise inclination of the guide with respect to the helix angle, to secure the alignment conditions previously described. A mounting block 331 for the guide 45 is secured by bolts or screws (not shown in FIG. 16) to the underside of the upper set of plates 307 in the vicinity of the desired location for the guide 45, and the ring member 308 is cut away in the vicinity of the block to permit the block to slide freely up and down with respect to the ring 308. The block 331 has a slot-shaped vertical bore 332 formed therein for the body of a lower extension portion 333 of the guide 45, from which protrudes a horizontal pivot pin 334 that in turn rides in, and is journaled in, a conforming horizontal groove. The alignment of pin 334 in the groove is precisely normal to the plane of the tape that extends between the drum assembly 61 and guide 45. The longer (in a horizontal direction) sides of the slot 332 are strictly normal to the pin 334, and are spaced apart for just a sightly greater dimension than the pin diameter, so as to snugly guide the pin in pivoting motion in a plane parallel to the tape extending between drum assembly 61 and guide 45. Thus the guide 45 can be adjusted to the desired angle "effectively" equal to the helix angle as previously defined. The adjustment method will be described in greater detail below. To lock the guide in the desired angular position, a pair of set-screws 337 are threaded into the block 331 to engage the guide extension body portion 333. These screws 337 are directed axially-normal to one another but at 45 degrees to the pivoting plane of guide 45, so that to change the inclination of the guide 45, one screw must be backed off, while the other is tightened. The initial adjusting process will be further described below.

Referring now to FIGS. 17 and 18, further details of the drive pulley 248 and guide block 247 assemblies are shown. Both assemblies are mounted on the base plate 203 at appropriate angles. The pulley 248 is fixed to a central shaft 341 that is driven by a motor that is mounted below the plate 203 and is not here shown. The pulley has two driving portions 342 and 343, of different diameters; the upper portion 342 for the carriage 141 of the guide 32 and its wire-strand cable 251 (FIG. 14), and the lower portion 343 for the ring member 253 and its cable 252. The cables fit around the pulley in several (e.g., five) turns of a helical threaded groove cut into the pulley 248 to prevent the turns from overlapping.

The block assembly 247 includes a base block 351 upon which is mounted an upper flanged plate 352, which can be adjustably moved in a plane generally parallel to the tape run between drum 61 and guide 83, and can be clamped to the base block 351 by clamping bolts 353 (FIG. 14), which pass through enlarged openings in the plate 352. An upstanding portion 354 of the plate 352 is provided with a flat gauge face 356 which is adjusted to be parallel to the desired plane of the tangential run of tape extending between drum assembly 61 and guide 83, before the bolts 353 are tightened. The guide 83 itself extends downwardly from a bracket 357, which extends horizontally in cantilevered fashion from a base portion 358 having a flat gauge face (not shown) fitting against the face 356 of member 352. The member 357 may thus be slidably adjusted along face 356 for horizontal and vertical positioning of guide 83, and for adjusting the angular inclination of the guide until precisely the helix angle is obtained for the guide, and then the member 357 may be clamped in the usual way to the member 352 as by means of clamping bolts and screws (not shown). Air may be supplied under pressure to guide 83, through a hose (not shown), a nozzle 361, and interior passages, also not shown, leading to openings on the tape-confronting surface of guide 83, for floating the tape frictionlessly around the guide during operation.

A similar way of adjusting the inclination of guide 45 is also provided for in the assembly 247. A plate 362 is formed for sliding adjustably upon the surface 356 of member 352, and for being clamped thereto by not-shown clamping bolts in the usual manner. Upon the upper and lower extremities of plate 362 are bolted a pair of parallel plates 363 and 364, which extend in cantilever fashion from the plate 362 and terminate in hooked portions opening toward and receiving the guide 45 at the termination of its threading circuit around the drum assembly 61. Thus, when adjusted to the desired position, the hooked portions of plates 363 and 364 engage and cradle the upper and lower extremities of the guide 45, which is shown in phantom in its terminal position. A clamping arm 366 (FIG. 18) is then activated, as by sensing means (not shown) and controller 56, to swing out and engage the midportion of the guide 45 on the side thereof opposite the hooked portions of plates 363 and 364, and to clamp the guide against the hooked portions of the plates. The arm 366 pivots on a shaft 365 that is mounted between plates 363 and 364, and is swung by means of a toggle-arm 367 and spring-loaded variable length link 368 assembly attached to the arm 366 and to a rotary solenoid 369, which in turn is mounted on the member 362. When assembly is open (solid lines FIG. 18), link 368 is in tension, but when the assembly is closed (phantom lines, FIG. 18), the spring portion of line 368 is in compression. The solenoid 369 may be arranged to be actuated either to open or to close the arm 366, the return force in either case being a spring means, incorporated into the solenoid mechanism and not here shown.

The arm 366 is also made use of to supply air under pressure to guide 45 in its terminal operating position, as by means of a hose (not shown) and nozzle 370 to the arm 366, and interior passages in the arm leading to an orifice 371 that is circumvallated by a rubber o-ring 372, which sealingly engages a flat face of the guide 45 midportion, in which is formed an air-receiving opening communicating with interior passages in the guide 45 and leading to openings in the tape-confronting surfaces of the guide.

The method for establishing the desired inclination for guide 45 can now be described. A test tape is threaded onto the machine, with the guide 45 in its terminal position, but with the set-screws 337 both backed-off (loosened) so that the guide is free to pivot on its pivot pin 334. The test tape is then run longitudinally and the inclination of the plate 362 is adjusted, with its hook-shaped cradling arms 363 and 364 engaging and tilting the guide 45, until it is apparent that the tape is running in its "natural" path, i.e., without unduly rubbing against the edge-guiding flanges of any of the guides it passes around. When this condition is achieved, the plate 362 is clamped in position, and then the set-screws 337 are tightened to lock the guide 45 in the inclination in which it engages both of the hook shaped arms 363 and 364. This adjustment is of course made in the factory, but can also be made, or corrected, in the field.

A somewhat similar toggle-latching structure 250 (FIG. 14) is provided for the terminal position of the guide 33. A mounting plate 391 is secured on legs 392 to the base plate 203, and a second rotary solenoid (not visible in FIG. 14) is mounted on the lower side of plate 391, but with a shaft 393 of the solenoid extending upwardly from the plate. To the shaft is affixed an arm 394, which is connected through a link member 395 (identical to link 368) to an end of a pivoting arm 396, which pivots on a pivot pin 397 so as to retract, and then re-engage, a hook-shaped end 398 of the arm 396, when the guide 33 approaches, or is to be released. The precise terminal position of the guide 33 is established by means of an adjustable stop element 399, which is mounted for adjustable sliding motion on, and for being clamped to, a vertical flat face of a base block 400, which is mounted on the base plate 203. To open the hook 398 for receiving or releasing the guide 33, the solenoid may be rotated anticlockwise as seen in FIG. 14; and for engaging the hook portion 398, the solenoid is actuated to rotate the arm 394 in a clockwise direction. The solenoid operating shaft 393 may also be arranged to be actuated either to open or to close the arm 394, the return force in either case being a spring means incorporated in the solenoid.

Thus there has been described a machine for extracting tape from a cassette and for threading the tape, first to a mono-planar disposition for longitudinal shuttling and transducing operation, and second, if desired, to a helical disposition around a scanning drum assembly, with the tape following a "natural" path both during and after the second threading operation, such that the tape centerline crosses all guide generatrices, except those of the scanning drum, perpendicularly.

What is claimed is:

1. Apparatus for wrapping a tensioned segment of magnetic tape around a cylindrical scanning drum and particularly between two generatrices of said drum in a helical path having a predetermined helix angle with respect to said generatrices, said apparatus including first tape guiding and tensioning means initially disposing said tape segment with the longitudinal centerline thereof lying in a first plane that is normal to the tape width, said first plane also being inclined at said helix angle to the generatrices of said drum, and said apparatus also comprising:

second tape guiding and tensioning means including a second cylindrical guide member and means for mounting said second guide member to move into engagement with said initially disposed tape segment so as to define the beginning of a wrapping operation and to thereafter cause movement of said second guide member at a predetermined inclination measured in a tangential plane of said drum, said inclination being at effectively said helix angle with respect to the drum generatrix of tangency of said tangential plane, and said movement being in a predetermined helical circuit around said drum, so as to wrap a portion of said tape segment in said helical path;

said second cylindrical guide member being particularly arranged for bending said tensioned tape segment into a right cylindrical second bend of which the generatrices are perpendicular to a second plane defined by the centerline of the tape in the bend;

third means for guiding and tensioning the remainder of said tape in said segment and for bending a part of said remainder into a right cylindrical third bend of which the generatrices and a third bend axis are perpendicular to a third plane defining the centerline of the tape in the third bend; and said third means being arranged for extension of said tape centerline in said first plane between said first guiding and tensioning means and said third bend, for extension of said tape centerline in said second plane between said second and third bends, and for movement of said third bend axis, during said helical threading operation, along a generally tangential trajectory spaced somewhat from said drum, with said third plane being particularly defined as continuously intersecting said first plane along the tape centerline in said first plane, and as continuously intersecting said second plane along the tape centerline in said second plane, so as to cause said tape segment remainder to be twisted about the longitudinal centerline thereof so that said centerline is wrapped about all of said guide means perpendicularly to the generatrices thereof throughout said wrapping operation.

2. Apparatus as described in claim 1, wherein said first guiding and tensioning means includes a set of right-cylindrical guide members arranged in said first plane and axially normal thereto adjacent said drum, and means for tensioning said tape around said members.

3. Apparatus as described in claim 1, wherein the tape centerline at said second guide means at the end of said wrapping operation lies in said second plane inclined to said drum generatrices at said drum helix angle, said second plane having an intersection with said first plane along a line whereon is positioned a first cylindrical member of the first guide means from which the remainder of said tape segment runs direct to the third guide means;

whereby the twist in said tape is caused to take place entirely between said first and third guide means.

4. Apparatus as described in claim 1, wherein said third guide means includes a right-cylindrical third guide member constrained to move in said first plane and along a substantially rectilinear path therein during said wrapping operation, and to tilt in a tilting plane that is normal to said rectilinear path, so as to maintain the axis of the third guide member perpendicular to a third plane defined by said rectilinear path and by the tape centerline between said second and third guide means;

whereby said tape centerline around said third guide member is maintained in said third plane normal to the axis and generatrices of said third guide member.

5. Apparatus as described in claim 1, wherein said third guide means includes a right-cylindrical third guide member constrained to move in said first plane and along a curvilinear path therein during said threading operation, and to tilt in a tilting plane that is normal to the tape centerline between said third guide member and an immediately proximal first cylindrical guide member of said first guide means;

said third guide member being constrained to tilt in said tilting plane so as to remain perpendicular to a third plane defined by the tape centerline between said first and third guide members and the tape centerline between said second and third guide members.

6. Apparatus as described in claim 5, wherein said third guide means includes a pair of curvilinear rail members disposed in predetermined spaced relation to a first cam plane parallel to said initial plane so as to generally bracket said curvilinear path, and said third guide member is provided with a carriage having a pair of axially-parallel first and second flanged wheels running between said rail members and functioning as cam-followers with respect thereto, so as to maintain said third guide member on said curvilinear path during said wrapping operation;

said third guide means being mounted for pivoting motion about a pivoting axis perpendicular to the third guide axis and extending perpendicularly between the axes of said flanged wheels, so as to permit said tilting of the third guide member to remain normal to the plane of the tape centerline between said first, third and second guide members; and said rail members being particularly shaped and curved, with respect to the dimensional span between the axes of said flanged wheels, so as to maintain said pivoting axis of said third guide member aligned with said first guide member throughout said wrapping operation, and so as thereby to constrain said third guide member for tilting only in said desired tilting plane.

7. Apparatus as described in claim 6, wherein said third guiding means is also provided with a third curvilinear rail member mounted and disposed in a second cam plane parallel to the first cam plane but spaced therefrom in a generally axial direction of said third guide member;

said third guide member is provided with a spherically-rimmed third cam-follower wheel mounted for rotation on the same axis with said third guide member and engaging said third rail member so as to function as a cam-follower with respect thereto, and so as to control the tilting of said third guide member and to maintain said third guide member axially perpendicular to said plane of the tape centerline between said first, third and second guide members throughout said wrapping operation; and a spring means for loading said third guide member with respect to said carriage to maintain said third wheel in cam-following engagement with said third rail.

8. Apparatus as described in claim 7, wherein said carriage is also provided with a fourth flanged wheel mounted in axial parallelism with, and at the end of an arm pivoting from said carriage upon the same axis with, one of said pair of first and second flanged wheels, a spring means for loading said arm with respect to said carriage so as to urge folding of said arm toward said carriage and to urge said fourth wheel against the same rail member engaged by the other of said pair;

whereby said carriage and associated assembly is maintained in springly and slidably wedged relationship between said first and second rail members and is constrained to cause said third guide member to follow said curvilinear path during said wrapping operation.

9. Apparatus as described in claim 1, wherein a helical cam is provided for said second guide and is coaxially arranged with respect to said drum and the helical wrapping zone thereof; and parallel-motion mounting means are provided, and a second-guide carriage is mounted thereon, for carrying said second guide member in said second-guide helical circuit around said drum;

said second-guide carriage having a cam-follower portion engaging said helical cam for guiding said carriage for constrained motion parallel to the axis of said drum;

said parallel-motion mounting means being arranged for maintaining the pitch inclination of said second guide at the desired pitch angle during said circuit around said drum; and a motor-driven rotating plate being provided for rotation upon the same axis as said drum for mounting and supporting said parallel-motion mounting means and for causing said second carriage and second guide to move in said helical circuit around said drum during said wrapping operation.

10. Apparatus as described in claim 9, wherein said tape is stored in a cassette on two reels having parallel axes, with both reels lying on said initial plane when said cassette is mounted in said apparatus for said wrapping operation, said initially disposed tape segment being arranged between two initial cylindrical guides of said first guide means;

a first fixed entrance-exit cylindrical guide member being arranged at said pitch angle adjacent said drum and in tangential prolongation of said helical wrapping zone and between said initially disposed tape segment and said drum so as to be engaged by said tape segment as said second guide begins to move in said helical circuit around said drum and engages the side of said tape segment opposite said drum and fixed guide;

said first fixed entrance-exit guide being mounted to accurately dispose said tape segment at said desired pitch angle.

11. Apparatus as described in claim 10, wherein said second guide member has an inoperating position lying entirely below and axially spaced in the drum-axis direction from said initial plane, and said helical cam has an extension portion for guiding said second carriage cam-follower to move said second guide member from said inoperating position and into said initial plane between said cassette and said initially-disposed segment of tape for beginning said wrapping operation.

12. Apparatus as described in claim 9, wherein said parallel-motion mounting means comprises a pair of flexible plates mounted in parallel with said rotating plate, so as to rotate therewith about said drum axis, said plates having circular openings therein for fitting around said drum, and being secured in drum-axially spaced relation to each other and to said rotating plate on one side of said drum remote from said second guide, while being secured in drum-axially spaced relation to each other upon the same side of said drum as said second guide, but free for drum-axial motion of said second guide, so as to constitute a parallel-motion linkage mounting said second guide for drum-axial motion while making said helical circuit around said drum, and for ensuring that said second guide is maintained at said desired pitch angle of inclination during said circuit.

13. Apparatus as described in claim 10, wherein said drum is provided with a second fixed exit-entrance cylindrical guide normal to said final plane and adjacent the drum in tangential prolongation of said helical wrapping zone at the other end thereof from said first fixed exit-entrance guide, said second fixed guide being mounted for accurate positioning of said tape in said wrapping zone.

14. Apparatus as described in claim 13, wherein said second guide rotates on said rotating plate at a radius greater than that of said second fixed exit-entrance guide and is arranged to so rotate sufficiently beyond said second fixed guide that said tape segment is bent around said fixed guide outboard from said drum of a tangential tape portion extending from said helical wrapping zone to said second fixed guide.

15. Apparatus as described in claim 14, wherein said second guide is arranged on said carriage thereof at a predetermined angular inclination offset from said desired pitch angle such that said second guide arrives in true axial parallelism with said second fixed guide at the end of said wrapping operation.

16. Magnetic tape transport apparatus including means for receiving a magnetic tape cassette along a predetermined insertion path, said cassette being of the type having a pair of tape reels disposing the longitudinal centerline of said tape in a predetermined first plane normal to said insertion path and further disposing a segment of tape between said reels for access by threading and operating elements of said apparatus, comprising:

reel motor means for paying out and tensioning said tape;

capstan means mounted in said first plane for engaging and transporting said tape longitudinally;

longitudinal-tape-transducing means mounted in said first plane;

tension-sensing means coupled to said reel motors and engaging said tape segment for tensioning said segment across said capstan and transducing means in a position of said segment corresponding to a longitudinal-scanning mode of operation of said apparatus;

helical-tape-scanning means mounted near said longitudinal-scanning position of said segment and including a drum assembly inclined to said first plane at a predetermined helix angle; and means for disposing at least a portion of said tape segment in transducing relation with said helical-scanning means to define a helical-scanning mode of operation of said apparatus;

said tape being arranged to confront said drum assembly along generatrices thereof that are inclined at said helix angle to the tape centerline, but to confront all other tape-guiding elements of the apparatus along generatrices that are substantially perpendicular to the tape centerline.

17. Apparatus as described in claim 16, wherein said means for disposing said tape in said helical-scanning mode may be operated while said apparatus is in said longitudinal-scanning mode, and said apparatus may then be operated in both modes concurrently.

18. Apparatus as described in claim 16, wherein said capstan is mounted between said reels and said tape segment in the mounted position of said cassette, and a pair of movable guides are mounted on the opposite side of said segment remote from said capstan, said movable guides being provided with means for moving toward said segment and said capstan on paths bracketing said capstan, so as to move said segment into engaged and wrapped relation around a substantial portion of the capstan periphery and so as to provide a substantial frictional driving grip between said capstan and tape when said tape is tensioned.

19. Apparatus as described in claim 18, including a pivoting plate having said movable guides mounted thereon, and substantially along a pivoting radius thereof at a spacing slightly greater that the diameter of the capstan, so as to follow concentric arcuate paths bracketing said capstan and to move said tape into said wrapped relation around said capstan when said plate is pivoted.

20. Apparatus as described in claim 19 wherein a tape-sensing means is also mounted on said pivoting plate so as to be in operative relation with said tape in all positions of said pivoting plate;
   said tape-sensing means comprising a U-shaped member with two upstanding arms positioned to bracket said tape in all positions of said pivoting plate;
   one of said upstanding arms containing a light source and the other of said upstanding arms containing a photo-sensing means providing a signal to said reel motor means whenever opaque portions of said tape are not bracketed by said upstanding arms.

21. Apparatus for receiving a magnetic tape cassette for processing, said cassette being of the type having a pair of tape reels and a segment of tape between said reels disposed for access by threading and operating elements of said apparatus, comprising:
   means for tensioning said tape;
   capstan means mounted on said apparatus for engaging and transporting said tape longitudinally;
   longitudinal-tape-transducing means mounted on said apparatus:
   tension-sensing means coupled to said tensioning means and engaging said tape segment in a first position for tensioning said segment across said capstan and transducing means in a longitudinal-scanning mode of operation of said apparatus;
   helical-tape-scanning means mounted near said longitudinal-scanning position of said segment and including a drum assembly inclinded at a predetermined helix angle;
   means for disposing at least a portion a portion of said tape segment in a second position in transducing relation with said helical-scanning means in a helical-scanning mode of operation of said apparatus;
   said tape being arranged to confront said drum assembly along generatrices thereof that are inclined at said helix angle; and
   said means for disposing enabling said apparatus to be operated selectively in a longitudinal-scanning mode of operation or a helical-scanning mode of operation, or said means for disposing said tape in said helical-scanning mode may be operated while said apparatus is in said longitudinal-scanning mode, and said apparatus may then be operated in both modes concurrently.

22. Apparatus as described in claim 21, wherein said capstan is mounted between said reels and said tape segment in the mounted position of said cassette, and a pair of movable guides are mounted on the opposite side of said segment remote from said capstan, said movable guides being provided with means for moving toward said segment and said capstan on paths bracketing said capstan, so as to move said segment into engaged and wrapped relation around a substantial portion of the capstan periphery and so as to provide a substantial frictional driving grip between said capstan and tape when said tape is tensioned.

23. Apparatus as described in claim 22, including a pivoting plate having said movable guides mounted thereon, and substantially along a pivoting radius thereof at a spacing slightly greater than the diameter of the capstan, so as to follow concentric arcuate paths bracketing said capstan and to move said tape into said wrapped relation around said capstan when said plate is pivoted.

24. Apparatus for receiving a magnetic tape cassette for processing, said cassette being of the type having a pair of tape reels and a segment of tape between said reels disposed for access by threading and operating elements of said apparatus, comprising:
   means for tensioning said tape;
   capstan means mounted in said first plane for engaging and transporting said tape longitudinally; said capstan means mounted between said reels and said tape segment in the mounted position of said cassette,
   a pivoting plate mounted on said apparatus for pivotal movement with respect thereof;
   a pair of movable guides mounted on the pivoting plate in fixed relation to said plate and each other and on the opposite side of said segment remote from said capstan, said movable guides being provided with means for moving toward said segment and said capstan substantially along a pivoting radius of the pivoting plate at a spacing slightly greater than the diameter of the capstan, so as to follow concentric arcuate paths bracketing said capstan, so as to move said segment into engaged and wrapped relation around a substantial portion of the capstan periphery when said plate is pivoted and so as to provide a substantial frictional driving grip between said capstan and tape when said tape is tensioned.

25. Apparatus for wrapping a tensioned segment of magnetic tape around a cylindrical scanning drum and particularly between two generatrices of said drum in a helical path around the drum, said apparatus including first tape guiding and tensioning means initially disposing said tape segment at one of the generatrices of said drum, and said apparatus also comprising:
   second tape guiding and tensioning means including a second cylindrical guide member and means for mounting said second guide member to move into engagement with said initially disposed tape segment so as to define the beginning of a wrapping operation and to thereafter cause movement of said second guide member in a predetermined helical circuit around said drum, so as to wrap a portion of said tape segment in said helical path;
   said second cylindrical guide member being particularly arranged for bending said tensioned tape segment into a right cylindrical second bend;
   third means for guiding and tensioning the remainder of said tape in said segment and for bending a part of said remainder into a right cylindrical third bend; and
   said third means being arranged for extension of said tape segment between said first guiding and tensioning means and said third bend, for extension of said tape between said second and third bends, and for movement of a third bend axis, during said helical threading operation, along a trajectory spaced somewhat from said drum, so as to cause said tape segment remainder to be wrapped about all of said guide means perpendicularly to the generatrices thereof throughout said wrapping operation.

26. Apparatus for wrapping a tensioned magnetic tape around a scanning drum having a center axis and a predetermined pitch angle, in a helical zone on the drum, beginning from an initial tape disposition near the beginning of said helical wrapping zone, comprising:
first guide means for initially disposing a segment of said tensioned tape at said pitch angle at the beginning of the wrapping zone;
second guide means for moving into engagement with said initially disposed tape segment and to thereafter move constantly inclined at substantially said pitch angle, in a second-guide helical circuit around said drum, so as to wrap a portion of said tape segment in said helical zone; and
third means for guiding and tensioning the remainder of said tape in said segment and for bending a part of said remainder for movement along a trajectory spaced somewhat from said drum, so as to hold said remainder of said tape out of frictional contact with said drum and with said drum-wrapped tape portion, and so as to cause said tape segment remainder to be wrapped about all of said guide means perpendicularly to the generatrices thereof throughout said wrapping operation.

27. Apparatus as described in claim 26, wherein said first guide means includes a set of right-cylindrical guide members arranged so as to be inclined at substantially said pitch angle, and means for tensioning said tape around said members.

28. Apparatus for disposing a tape in a helical wrap on a scanning drum, comprising:
first, second and third cylindrical guides lying in and normal respectively to first, second and third planes, said planes intersecting at an apex point and defining three faces of a tetrahedron, with said second and third planes intersecting said scanning drum between said apex point and a base portion of said tetrahedron, said first and second guides being positioned near said base portion of said tetrahedron and said third guide being positioned near said apex point, and said tape being arranged to run to and bend around said first guide, thence to and around said third guide, thence to and around said second guide, thence to and around said scanning drum in said helical path, and thence to a fourth guide also lying in and normal to said first plane; and
means for tensioning said tape around said guides and drum with the tape centerline lying in said first plane outboard of said first and fourth guides, and along the intersection of said first and third planes between said first and third guides, and along the intersection of said second and third planes between said second and third guides, and in said third plane between said second guide and said drum, and in said first plane between said drum and fourth guide.

29. Apparatus for disposing a tape in a helical wrap on a scanning drum, comprising:
three cylindrical guides each normally intersecting a respective one of three planes, said planes intersecting at an apex, point and three edges so as to define three faces of a tetrahedron, and two of said planes intersecting said scanning drum remote from said edges to define the ends of said helical wrap therebetween, the guide for one of said drum-intersecting planes being positioned tangent to the two coplanar edges of said tetrahedron adjacent said apex, and the other two guides being positioned tangent to the respective coplanar one of said two edges and defining with said apex two edge segments generally bracketing said drum;
said tape being arranged with a midportion thereof bent around said guide adjacent the apex and the two end portions of said tape being bent around said other two guides, respectively, with the tape centerline running along said two edge segments and from one of said other two guides to and around said drum in said helical wrap; and
means for tensioning said tape around said guides and drum.

* * * * *